US011256772B2

United States Patent
Shah et al.

(10) Patent No.: US 11,256,772 B2
(45) Date of Patent: *Feb. 22, 2022

(54) SYSTEMS AND METHODS FOR PROVIDING CLIENT-SIDE ENABLEMENT OF SERVER COMMUNICATIONS VIA A SINGLE COMMUNICATION SESSION FOR A PLURALITY OF BROWSER-BASED PRESENTATION INTERFACES

(71) Applicant: salesforce.com, inc., San Francisco, CA (US)

(72) Inventors: Anal Shah, Fremont, CA (US); Kanan Garg, San Francisco, CA (US); Justin Macmillin, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/301,691

(22) Filed: Apr. 12, 2021

(65) Prior Publication Data

US 2021/0232644 A1 Jul. 29, 2021

Related U.S. Application Data

(63) Continuation-in-part of application No. 17/248,475, filed on Jan. 26, 2021, and a continuation-in-part of (Continued)

(51) Int. Cl.
*H04L 29/08* (2006.01)
*G06F 16/957* (2019.01)
(Continued)

(52) U.S. Cl.
CPC .......... *G06F 16/957* (2019.01); *H04L 67/141* (2013.01); *H04L 67/142* (2013.01); *H04L 67/42* (2013.01)

(58) Field of Classification Search
CPC ..... G06F 16/957; H04L 67/141; H04L 67/42; H04L 67/142; H04L 67/02
See application file for complete search history.

(56) References Cited

U.S. PATENT DOCUMENTS 5,577,188 A 11/1996 Zhu
5,608,872 A 3/1997 Schwartz et al.
(Continued)

*Primary Examiner* — Kim T Nguyen
(74) *Attorney, Agent, or Firm* — LKGlobal | Lorenz & Kopf, LLP

(57) ABSTRACT

A method for communicating with a server system, by a client device via a browser application, is provided. The method: (i) presents browser-based presentation interfaces including browser tabs and/or browser windows, the browser-based presentation interfaces including a master presentation interface and at least one slave presentation interface; (ii) establishes a single communication session with the server system, by the master presentation interface, the single communication session being associated with a session identifier configured to differentiate the single communication session; (iii) enables communication between the browser-based presentation interfaces and the server system via the single communication session, by: exchanging data communications between the master presentation interface and the server system using the single communication session; and permitting the at least one slave presentation interface to indirectly communicate with the server system via the master presentation interface; and (iv) dynamically updates each of the browser-based presentation interfaces in real-time.

20 Claims, 14 Drawing Sheets

Related U.S. Application Data application No. 16/814,326, filed on Mar. 10, 2020, now Pat. No. 10,977,334, said application No. 17/248,475 is a continuation of application No. 16/595,287, filed on Oct. 7, 2019, now Pat. No. 10,938,755, said application No. 16/814,326 is a continuation of application No. 16/140,705, filed on Sep. 25, 2018, now Pat. No. 10,642,916.

(51) Int. Cl.
*H04L 67/141* (2022.01)
*H04L 67/01* (2022.01)
*H04L 67/142* (2022.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,707,513 B2 | 4/2010 | Broda et al. |
| 7,730,478 B2 | 6/2010 | Weissman |
| 7,779,475 B2 | 8/2010 | Jakobson et al. |
| 8,014,943 B2 | 9/2011 | Jakobsen |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,989,120 B2 | 3/2015 | Mcnamara et al. |
| 9,420,038 B2 * | 8/2016 | Deyerle ............... H04L 65/60 |
| 9,489,356 B2 | 11/2016 | Sheretov et al. |
| 10,642,916 B2 | 5/2020 | Garg et al. |
| 10,686,739 B2 | 6/2020 | Macmillin et al. |
| 10,739,954 B2 | 8/2020 | Dipietro et al. |
| 10,938,755 B1 * | 3/2021 | MacMillin ............ H04L 51/04 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0078431 A1 | 4/2004 | Ahn |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |

(56) References Cited

U.S. PATENT DOCUMENTS

| | | |
|---|---|---|
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0240054 A1 | 10/2007 | Todoroki et al. |
| 2008/0249972 A1 | 10/2008 | Dillon |
| 2009/0063414 A1 | 3/2009 | White et al. |
| 2009/0100342 A1 | 4/2009 | Jakobsen |
| 2009/0177744 A1 | 7/2009 | Marlow et al. |
| 2010/0031153 A1 | 2/2010 | Hyland et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobsen et al. |
| 2013/0212497 A1 | 8/2013 | Zelenko et al. |
| 2013/0218948 A1 | 8/2013 | Jakobsen |
| 2013/0218949 A1 | 8/2013 | Jakobsen |
| 2013/0218966 A1 | 8/2013 | Jakobsen |
| 2013/0247216 A1 | 9/2013 | Cinarkaya et al. |
| 2018/0091215 A1* | 3/2018 | Yang ..................... H04B 7/155 |
| 2018/0367477 A1 | 12/2018 | Hariram et al. |
| 2019/0020673 A1 | 1/2019 | Weinstein et al. |
| 2020/0218771 A1 | 7/2020 | Garg et al. |

* cited by examiner

SYSTEMS AND METHODS FOR PROVIDING CLIENT-SIDE ENABLEMENT OF SERVER COMMUNICATIONS VIA A SINGLE COMMUNICATION SESSION FOR A PLURALITY OF BROWSER-BASED PRESENTATION INTERFACES

CROSS-REFERENCE TO RELATED APPLICATIONS

This application is a continuation in part of U.S. patent application Ser. No. 16/814,326, filed Mar. 10, 2020, which is a continuation of U.S. patent application Ser. No. 16/140,705, filed Sep. 25, 2018, the entire contents of which are incorporated herein by reference.

This application is also a continuation in part of U.S. patent application Ser. No. 17/248,475, Jan. 26, 2021, which is a continuation of U.S. patent application Ser. No. 16/595,287, filed Oct. 7, 2019, the entire contents of which are incorporated herein by reference.

TECHNICAL FIELD

Embodiments of the subject matter described herein relate generally to client-server communications techniques established on the client side. More particularly, embodiments of the subject matter relate to a browser-based, client-side mechanism for enabling more than one presentation interface to communicate with a server using a single communication session.

BACKGROUND

During a web-browsing session, a user may navigate various websites using more than one browser application window and/or browser application tab. Users may wish to open certain webpages or sections of webpages and to keep them open, while continuing to browse other websites or sections using other open tabs or windows. In circumstances wherein a user has opened and is currently using a plurality of windows or tabs, servers communicating with the user's browser application are generally required to maintain a separate communication session for each open tab or window, thus requiring multi-threaded communications between the server and the client device. A server may not have the resources to maintain these multi-threaded communication sessions.

Accordingly, it is desirable to provide client-server communications solutions that are less resource-intensive on the server-side. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for communicating with a server system, by a client device comprising a computer system configured to store, maintain, execute, and support a browser application. The method establishes a single communication session with a server system, by the client device, wherein the single communication session comprises one individual client-side, browser-based communication session; presents a plurality of browser-based presentation interfaces comprising at least one of browser-based tabs and browser-based windows, by the client device, wherein the browser-based presentation interfaces are associated with the browser application; enables communication between the plurality of browser-based presentation interfaces and the server system via the single communication session, wherein the communication comprises server system data transmissions received by the client device via the single communication session and client device data transmissions transmitted by the client device; and dynamically updates each of the plurality of browser-based presentation interfaces in real-time, by the client device, based on the server system data transmissions and the client device data transmissions.

Some embodiments of the present disclosure provide a client device configured to communicate with a server system, the client device configured to store, maintain, execute, and support a browser application. The client device includes a system memory element; a communication device, configured to establish communication connections to a server system and to transmit and receive data via the communication connections; at least one processor communicatively coupled to the system memory element and the communication device, the at least one processor configured to: establish a single communication session with the server system, wherein the single communication session comprises one individual client-side, browser-based communication session; present a plurality of browser-based presentation interfaces comprising at least one of browser-based tabs and browser-based windows, wherein the browser-based presentation interfaces are associated with the browser application; enabling communication between the plurality of browser-based presentation interfaces and the server system via the single communication session, wherein the communication comprises server system data transmissions received by the client device via the single communication session and client device data transmissions transmitted by the client device; and dynamically updating each of the plurality of browser-based presentation interfaces in real-time, based on the server system data transmissions and the client device data transmissions.

Some embodiments of the present disclosure provide a non-transitory, computer-readable medium containing instructions thereon, which, when executed by a processor, are capable of performing a method for communicating with a server system, by a client device comprising a computer system configured to store, maintain, execute, and support a browser application. The method receives a user input request to execute the browser application, via a user interface of the client device; and, in response to the user input request, executes the browser application; presents a first one of a plurality of browser-based presentation interfaces; and establishes a single communication session between the first one and the server system, by the client device, wherein the single communication session comprises one individual client-side, browser-based communication session; receives one or more additional user input requests to open additional browser-based presentation interfaces, via the user interface of the client device, wherein the plurality of browser-based presentation interfaces comprise the first one and the additional browser-based presentation interfaces; presents the plurality of browser-based presentation interfaces comprising at least one of browser-based tabs and browser-based windows, by the client device, wherein the browser-based presentation interfaces are associated with the browser application; enables communication between the plurality of browser-based presentation interfaces and the server system via the single communication session, wherein the communication comprises server system data transmissions received by the client device via the single communication session and client device data transmissions transmitted by the client device; and dynamically updates each of the plurality of browser-based presentation interfaces in real-time, by the client device, based on the server system data transmissions and the client device data transmissions.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
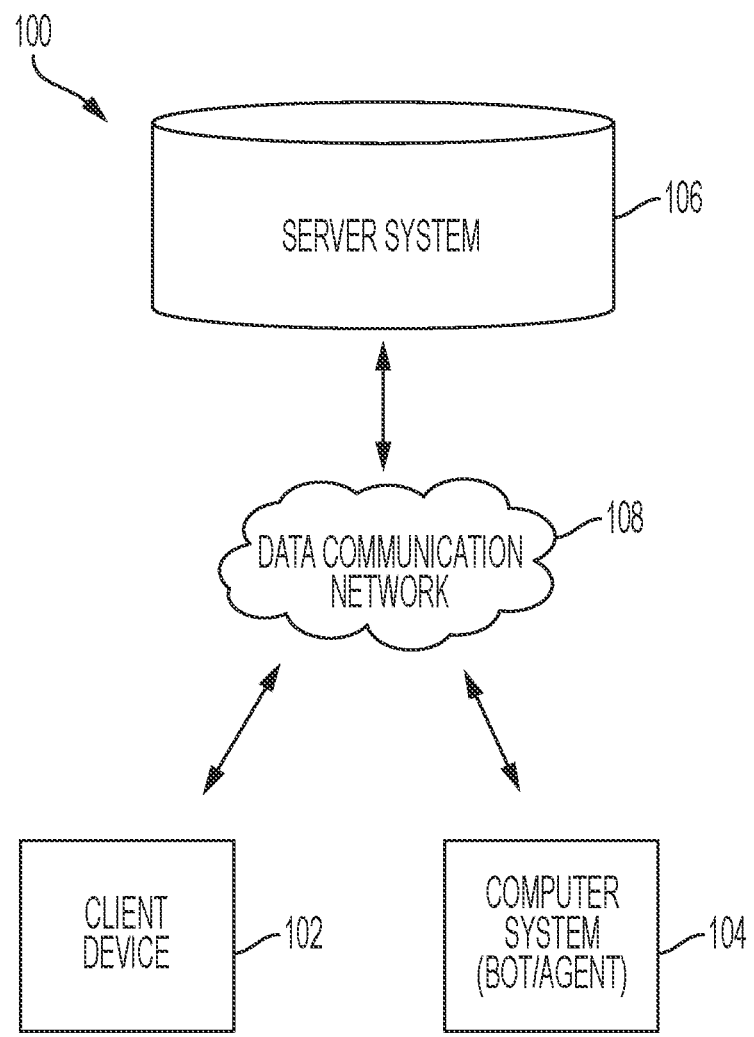
FIG. 1 is a diagram of a system for providing a client-side, browser-based, single communication session for a plurality of browser-based presentation interfaces, in accordance with the disclosed embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems and methods for establishing a client-side, browser-based solution for communicating with one or more servers by a plurality of presentation interfaces, and corresponding chat messaging interfaces, provided by a client device. More specifically, the subject matter relates to establishing a master/slave model for the plurality of presentation interfaces, such that one particular "master" tab or window for the browser application establishes a communication session for exchanging data messages with the one or more servers and acts as an intermediary to facilitate the exchange of data transmissions between the one or more servers and at least one "slave" tab or window for the browser application. Further, the present disclosure provides systems and methods for ensuring continuity of rich content for chat messaging data displayed by a chat messaging interface presented by one of the above-described presentation interfaces. Specifically, providing rich content chat messages for newly-opened secondary browser windows or browser tabs (i.e., slave presentation interfaces) by locally storing and extracting rich content chat messages in a format compatible with preserving and retaining rich content characteristics of the chat messaging data, instead of converting locally stored chat messages into a plain-text format as is common in the art.

Certain terminologies are used with regard to the various embodiments of the present disclosure. A browser is a software application used to locate and display web pages, which may be included as part of the internet and/or as part of a specified intranet. A presentation interface is a graphical user interface (GUI) associated with the browser application, the GUI configured to present a document or panel including website data, text-based elements, graphical elements, user-selectable elements (e.g., menus, hyperlinks), and any other web-based, visually-presented graphic or text element configured to convey website data and/or to receive user input data. A chat messaging interface is a graphical element provided by a presentation interface that enables a user to communicate with another chat participant. Typically, a chat messaging interface is implemented as a widget or window-inside-browser-window that is smaller than the browser tab or browser window (i.e., browser presentation interface GUI). The chat messaging interface is configured to present (1) user-entered communications, and (2) communications received by the client device and directed to the user from other chat participants. The chat messaging interface is further configured to present communications from the user of the client device and other chat participants (e.g., an agent, a chat-bot) using text or rich content.

Rich content may include graphical elements, enhanced formatting, interactive functionality, and the like. Graphical elements include pictures, symbols, icons, and any other visual representation displayed as part of a presentation interface (i.e., browser window, browser tab). Enhanced formatting refers to visually augmented text representations that include color, styling (e.g., bold text, italic text), text sizing, and other HyperText Markup Language (HTML) features (e.g., hyperlinks). Text representations with enhanced formatting may also be referred to as formatted text, styled text, or rich text. Interactive functionality refers to graphical elements configured to receive user input, such as a graphical button for virtual "push" via user click/selection, a radio button filled in by user selection, a checkbox that is "checked" by user selection, a picture or icon that is highlighted, framed, or otherwise indicated as selected by user click/selection, a graphical dial or slider configured for user adjustment, or the like. Interactive functionality of rich content includes any visual representation configured for user interaction and displayed via a chat messaging interface.

A communication session is a data transfer thread between the server system and a particular aspect of the client device which receives server-based data via the communication session. A master browser window or master browser tab (presented as part of the executed browser application) is an aspect of the client device capable of initiating and maintaining the communication session. Slave windows or tabs communicate with the one or more servers by broadcasting data to be received by the master presentation interface, and the master presentation interface is configured to transmit the received data to the one or more servers.

As described in greater detail below in the context of FIGS. 14-15, in exemplary embodiments described herein, information identifying the master and slave status associated with different browser tabs is maintained in a private variable associated with one or more of the browser tabs, rather than session storage, to account for differences in how different browser applications manage or restrict session storage. In this regard, the private variable is stored in memory independent of or separate from the browser storage. In exemplary embodiments, a broadcast application program interface (API), which may alternatively be referred to herein as a broadcast pipeline, is utilized by a browser tab to broadcast a master/slave status request to other browser tabs containing an active chat messaging interface or widget integrated therein. The broadcast API allows the other browser tabs to respond directly to the requesting browser tab with a response that indicates the master or slave status of the respective browser tab. In exemplary embodiments, the broadcast API is a client-side API that allows for tabs to communicate using events when a value changes in either local storage or session storage. A master tab sets up receivers for events and slave tabs send events to the master tab via the broadcast API whenever an action like sending a user input occurs within a slave tab, while slave tabs set up receivers for events originating from the server that occur within the master tab.

Each browser tab that receives a broadcast master/slave status requests determines whether it is a master or a slave and transmits a response back to the requesting browser tab. In exemplary embodiments, each browser tab utilizes its associated unique identification information to identify or otherwise obtain a file associated with the respective browser tab. The file includes a value for a private variable that indicates whether that particular tab is a master or a slave. The browser tab then responds to the requesting browser tab with an indication of its respective status. The requesting browser tab utilizes the local storage to identify the number of active chat messaging interfaces and waits until the corresponding number of active chat messaging interfaces have responded with indication of their respective master/slave statuses or until timing out. When the requesting browser tab receives indication that one of the other tabs is already a master, the requesting browser tab updates the private variable in the file associated with the requesting browser tab to indicate that the requesting browser tab is a slave. The requesting browser tab then retrieves the content for populating its instance of the chat messaging interface from the master browser tab, for example, by requesting the chat messaging content from the master browser tab, which obtains the chat messaging content from its session storage and provides it back to the requesting browser tab using the broadcast API, which, in turn, may copy or otherwise store the chat messaging content in its associated session storage. By using private variables instead of local storage or session storage to track the master/slave status of the various active instances of a chat messaging session, the desired master/slave behavior can be maintained independent of the type of web browser application being utilized, thereby preserving server-side resources by ensuring only a single communication session (or active long poll connection) exists for a given end user.

Turning now to the figures, FIG. 1 is a diagram of a system 100 for providing a client-side, browser-based, single communication session for a plurality of browser-based presentation interfaces associated with a client device 102, in accordance with the disclosed embodiments. As shown, the system 100 includes a client device 102 for operation by a user. The client device 102 may be implemented using a standalone personal computer, a portable computer (e.g., a laptop, a tablet computer, or a handheld computing device), a computer integrated into another device or system (e.g., a "smart" tv, a smartphone, or a smartwatch), or any other device or platform including at least one processor, some form of memory, and a user interface to allow a user to interact with the client device 102. The user interface may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the client device 102.

The client device 102 is capable of communicating with a remote server system 106 via a data communication network 108. The data communication network 108 may be any digital or other communications network capable of transmitting messages or data between devices, systems, or components. In certain embodiments, the data communication network 108 includes a packet switched network that facilitates packet-based data communication, addressing, and data routing. The packet switched network could be, for example, a wide area network, the Internet, or the like. In various embodiments, the data communication network 108 includes any number of public or private data connections, links or network connections supporting any number of communications protocols. The data communication network 108 may include the Internet, for example, or any other network based upon TCP/IP or other conventional protocols. In various embodiments, the data communication network 108 could also incorporate a wireless and/or wired telephone network, such as a cellular communications network for communicating with mobile phones, personal digital assistants, and/or the like. The data communication network 108 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

The server system 106 may include one or more remotely located servers, and the server system 106 provides any data for presentation via the browser application stored, maintained, executed, and supported by the client device 102. The server system 106 may provide internet-based data, intranet-based data, chat or messaging application data, communication session identifiers or other connection data, and any applicable data originating from a potential secondary computer system 104. The server system 106 may include any number of application servers, and each server may be implemented using any suitable computer. In some embodiments, the server system 106 includes one or more dedicated computers. In some embodiments, the server system 106 includes one or more computers carrying out other functionality in addition to server operations. In exemplary embodiments, the server system 106 operates within a client-server architecture, executing programs to serve the requests of other programs (i.e., a browser application executed by the client device 102). In this example, the client device 102 acts as the client, and the server system 106 performs some tasks on behalf of the client device 102, to include providing the browser application data.

One or more application servers of the server system 106 maintains and provides web-based data which enables users to interact over the Internet or an intranet. The client device 102 interacts with the server system 106 in such a way that the client device 102 provides data communications to the server system 106 and receives data communications from the server system 106. In certain embodiments, the server system 106 may act as an intermediary which receives data communications from the computer system 104 that are directed to the client device 102 (e.g., for a chat messaging session between the client device 102 and the computer system 104), wherein the server system 106 receives computer system 104 data communications and the server system 106 then forwards the computer system 104 data communications to the client device 102 as part of a particular functionality of a browser application that is maintained, executed, and utilized via the client device 102. For example, when the client device 102 initiates a chat application or messaging application via the browser application, the computer system 104 may be operated by a customer service agent, appointment secretary, or other agent communicating with the user of the client device 102 via the chat application. However, the computer system 104 does not communicate with the client device 102 directly. Instead, the server system 106 provides chat application or messaging application data, including functionality associated with the chat application itself, and also including transmitted messages from the agent using the computer system 104 which have been sent to the server system 106 first and then forwarded as part of the chat application data communications transmitted to the client device 102 throughout the duration of the chat or messaging session. For purposes of explanation, but without limitation, the computer system 104 may alternatively be referred to herein as a chatbot system. However, it should be appreciated that the computer system 104 is not limited to chatbots and could be realized as any sort of server system that is capable of responding to communications, events, or other data in real time.

During typical operation, the client device 102 executes a browser application and opens a first presentation interface for the browser application, wherein the first presentation interface establishes a communication session with the server system 106 to exchange communications between the client device 102 and the server system 106.

Figure 10:
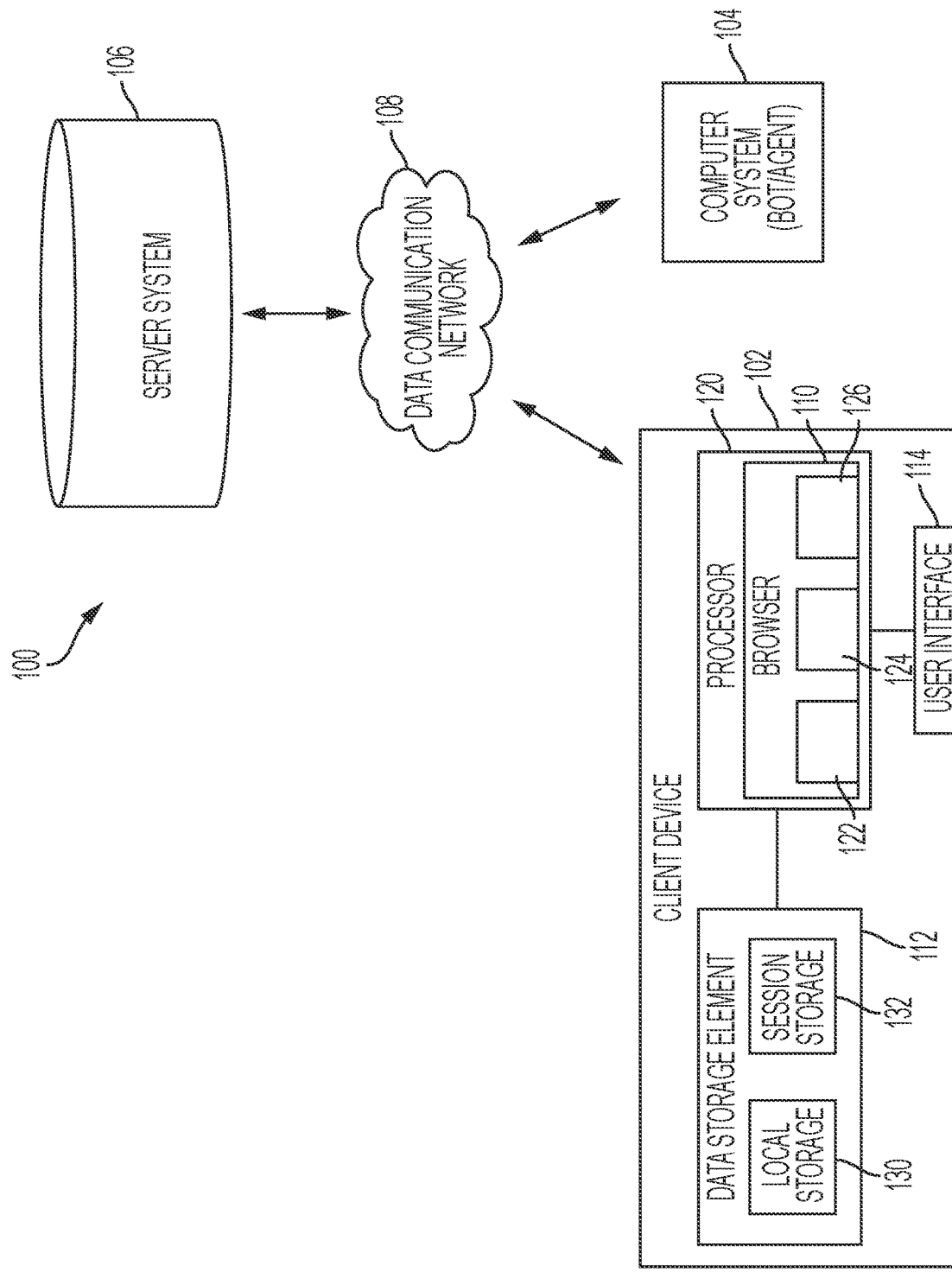
FIG. 10 is a diagram of a system for providing client-side, browser-based, communication session continuity for rendering rich content via a messaging application for a plurality of browser-based presentation interfaces, in accordance with the disclosed embodiments.

As illustrated in FIG. 10, in some implementations, the communication session is associated with one distinct session identifier, and the communication session is the sole, exclusive communication thread established between the browser application 120 and the server system 106, irrespective of the number of open browser-based presentation interfaces 122, 124, 126. The first presentation interface 122 is a browser tab or browser window that provides a corresponding chat messaging interface or "chat window" through which a user can exchange chat messages with other parties. The user of the client device 102 can use the chat messaging interface to exchange messages with a live agent operator of the computer system 104, or with an automated agent (e.g., a "chat-bot") configured to exchange chat messages with users originating from the computer system 104 or the server system 106. Chat messages exchanged via the chat messaging interface may include text-based messages that include plain-text words only, and/or rich content messages that include graphical elements, enhanced formatting, interactive functionality, or the like.

Referring to FIGS. 1 and 10, the client device 102 proceeds to open one or more additional presentation interfaces 124, 126 (i.e., browser windows, browser tabs), and implements a master/slave model for the plurality of presentation interfaces 122, 124, 126 such that only the one single, individual communication session is maintained by the master presentation interface 122 to communicate with the server system 106, and each of the slave presentation interfaces 124, 126 transmits data to, and receives data from, the server system 106 via the established communication session of the master presentation interface 122. Thus, a browser-based, client-side solution is implemented to permit communications between the server system 106 and the plurality of presentation interfaces 122, 124, 126 of the client device 102. Each opened presentation interface 124, 126 presents another chat messaging interface, and the same chat messaging session is maintained and presented via each new chat messaging interface. When new browser windows or new browser tabs are opened and new chat messaging interfaces are presented, text-based messages are typically maintained and presented for the chat messaging session. As described herein and in greater detail in U.S. patent application Ser. No. 16/164,649, the client device 102 is also configured to implement a browser-based solution to locally store and retrieve rich content, such that any number of open presentation interfaces 122, 124, 126 (e.g., browser tabs, windows) may exchange rich content messages via the chat messaging interface wherein the rich content of each chat message is maintained and presented in a rich content format on each new presentation interface.

As illustrated in FIG. 10, in one or more implementations, a data storage element 112 facilitates, supports or otherwise maintains local storage 130 that is accessible to all open presentation interfaces 122, 124, 126 of the browser application 120 for the lifecycle of the browser application 120, along with instances of session storage 132 that are associated with one particular presentation interface 122, 124, 126 of the browser application 120 for the lifecycle of the respective interface 122, 124, 126. As described in greater detail below in the context of FIGS. 5-6, in exemplary embodiments described herein, the presentation interfaces 122, 124, 126 utilize a private variable to track or otherwise maintain indicia of their respective master/slave status, to ensure that only a single communication session with the server 106 exists (e.g., via the master interface 122) independent of how the browser application 120 handles or manages session storage 132 upon opening of additional presentation interfaces 124, 126. For purposes of explanation, the subject matter may be described herein in the context of the presentation interfaces 122, 124, 126 being realized as tabbed GUIs (or simply tabs) that are presented within a larger browser window GUI; however, the subject matter is not limited to tabbed GUIs and may be implemented in an equivalent manner across multiple browser windows, and furthermore, may be implemented in connection with other non-browser client applications that support multiple presentation interfaces and communications with a remote system.

Figure 2:
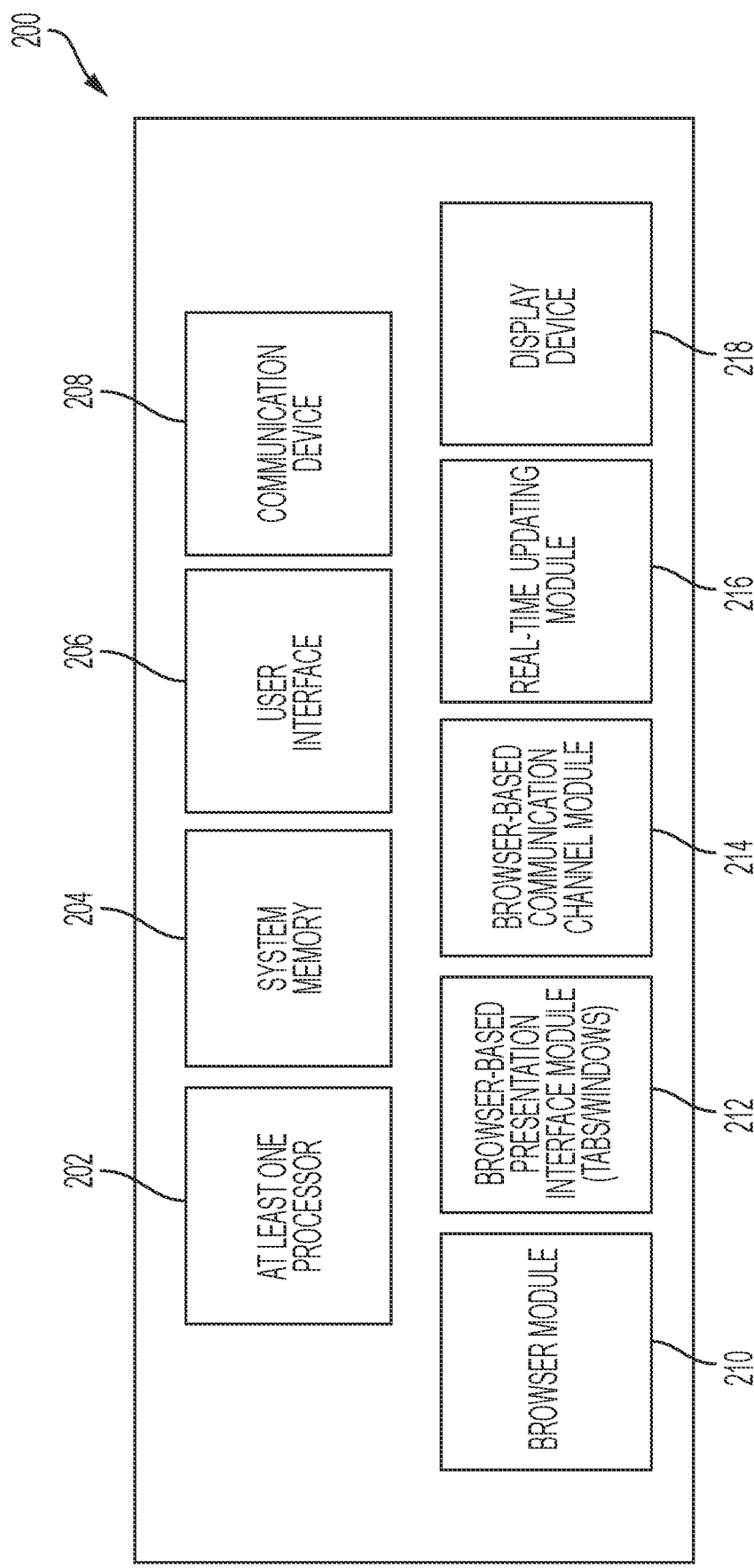
FIG. 2 is a functional block diagram of a computer system implemented as a client device communicating with a server system using a client-side, browser-based, single communication session for a plurality of browser-based presentation interfaces, in accordance with the disclosed embodiments.

FIG. 2 is a functional block diagram of a computer system implemented as a client device 200 communicating with a server system using a client-side, browser-based, single communication session for a plurality of browser-based presentation interfaces, in accordance with the disclosed embodiments. It should be noted that the client device 200 corresponds to the client device 102 of FIG. 1. The client device 200 generally includes, without limitation: at least one processor 202; a system memory element 204; a user interface 206; a communication device 208; a browser module 210; a browser-based presentation interface module 212; a browser-based communication channel module 214; a real-time updating module 216; and a display device 218. These elements and features of the client device 200 may be operatively associated with one another, coupled to one another, or otherwise configured to cooperate with one another as needed to support the desired functionality, as described herein. For ease of illustration and clarity, the various physical, electrical, and logical couplings and interconnections for these elements and features are not depicted in FIG. 2. Moreover, it should be appreciated that embodiments of the client device 200 will include other elements, modules, and features that cooperate to support the desired functionality. For simplicity, FIG. 2 only depicts certain elements that relate to the techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 communicates with system memory 204. In one or more implementations, the system memory element 204 is configured to store and maintain executable instructions, programming elements, computer hardware and software specifications and configurations, and any other data required for the performance of the client-side, browser-based chat-messaging communication techniques described herein. The system memory 204 may be realized using any number of devices, components, or modules, as appropriate to the embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the at least one processor 202. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the client device 200 via a browser software application connected to a server system (described previously with respect to FIG. 1). Accordingly, the user interface module 206 may initiate the creation and maintenance of presentation interfaces (e.g., browser windows and/or browser tabs) implemented as graphical user interfaces (GUIs), rendered on a display device 218. In certain embodiments, the display device 218 implements touch-sensitive technology for purposes of interacting with the GUI. Thus, a user can manipulate the GUI by moving a cursor symbol rendered on the display device 218, or by physically interacting with the display device 218 itself for recognition and interpretation. Using input keyboard commands and/or touch-screen commands (among other types of input commands), the user could manipulate the GUI to interact with a browser application to access and interact with various applications, widgets, or features associated with the browser application.

In particular, the user interface module 206 presents graphical elements associated with initiating and participating in a chat or messaging session, setting appointments, performing online shopping, and/or participating in any online activity as a guest user without the requirement of the user being logged in, but which permits the user to open additional browser windows or tabs and maintaining a chat session, an appointment-setting session, an online shopping session, or the like, and maintaining continuity between all open browser tabs and browser windows.

In one or more implementations, the user interface module 206 presents GUI elements, widgets, and/or components associated with initiating and participating in a chat messaging session, including providing a chat messaging interface as an included component of a presentation interface, wherein the chat messaging interface is configured to present chat messaging data (e.g., user input chat messages received via the user interface 206, and chat messages received from the server system via the single communication session referenced in FIG. 1). The user interface module 206 is further configured to provide text-based chat messaging data and rich-content chat messaging data via the chat messaging interface, and to support and maintain continuity by presenting rich content chat messaging data across multiple open and active chat messaging interfaces (i.e., chat windows, chat screens, chat widgets) provided by all open browser tabs and browser windows for the browser application.

The communication device 208 is suitably configured to communicate data between the client device 200 and one or more remote servers (which may provide the client device 200 with server system data and/or potentially additional communication data from an optional second participant computer system, as shown as reference 104 in FIG. 1). The communication device 208 may transmit and receive communications over a wireless local area network (WLAN), the Internet, a satellite uplink/downlink, a cellular network, a broadband network, a wide area network, or the like. As described in more detail below, data received by the communication device 208 may include, without limitation: browser application data, communication session identifier data, chat/messaging session data, chat messaging session connection data, online shopping data, online appointment setting data, text-based chat messaging data, rich content chat messaging data and other data compatible with the client device 200. Data provided by the communication device 208 may include, without limitation, user interactions with a chat/messaging session, including user input text-based chat messaging data, rich content chat messaging data, user input selections and interactions with rich content chat messaging data, online shopping session, online appointment setting session, and the like.

The browser module 210 is suitably configured to provide internet browser functionality for the client device 200, including the ability to locate, retrieve, and present websites requested by the client device 200 for user interaction via the client device 200. In one or more implementations, the browser module 210 is configured to open, maintain, and update a plurality of browser-based presentation interfaces (e.g., browser windows, browser tabs), in response to user input commands to open additional browser windows or tabs during browsing of a particular website, to navigate various links within a particular website which may open additional browser windows or tabs, and/or to refresh operation of a particular website. Further, the browser module 210 is configured to receive user input data to the browser application such that a user may make selections, navigate websites for the internet and/or an intranet, request server-based data, participate in chat/messaging sessions, online shopping sessions, and/or online appointment-setting sessions, and render text-based chat messaging data and rich content chat messaging data across a plurality of open browser windows and browser tabs simultaneously.

In some implementations, the browser module 210 includes session storage that is associated with one particular presentation interface of the browser application, and local storage that is accessible to all open presentation interfaces of the browser application. The browser module 210 permits the opened presentation interfaces to access and use the local storage, and permits a first presentation interface to access session storage corresponding to the first presentation interface. Thus, the browser module 210 enables opened presentation interfaces to exchange data communications with other opened presentation interfaces, and enables each presentation interface to maintain stored data that remains inaccessible to other opened presentation interfaces unless transmitted or broadcast by the associated presentation interface (via a browser-based communication channel module).

The browser-based presentation interface module 212 is configured to provide a plurality of presentation interfaces, via the browser application, for user interaction with the browser application. A presentation interface is a graphical user interface (GUI) associated with the browser application, the GUI configured to present a document or panel including website data, text-based elements, graphical elements, user-selectable elements (e.g., menus, hyperlinks), and any other web-based, visually-presented graphic or text element configured to convey website data and/or to receive user input data. Presentation interfaces are generally implemented as browser windows or browser tabs. The browser-based presentation interface module 212 presents a first presentation interface when the browser application is executed, and is generally configured to open additional presentation interfaces in response to user input commands received via the user interface 206.

The browser-based communication channel module 214 is configured to perform internal and external communication functions for the client device 200. The browser-based communication channel module 214 includes two separate and distinct aspects: (1) establishing and maintaining one single individual communication session between a master presentation interface and one or more remotely located servers, via the communication device 208; and (2) establishing and maintaining a broadcast pipeline for the plurality of presentation interfaces to communicate among themselves by broadcasting data transmissions to all open presentation interfaces of the browser application, which are received by those presentation interfaces that are configured to "listen" for applicable and relevant broadcasted data. As described herein, a single and individual communication session is a data transfer thread between the server system and a particular aspect of the client device which receives server-based data via the communication session. A master browser window or master browser tab (presented as part of the executed browser application) is an aspect of the client device capable of initiating and maintaining the communication session. Slave windows or tabs communicate with the one or more servers by broadcasting data to be received by the master presentation interface, and the master presentation interface is configured to transmit the received data to the one or more servers.

The real-time updating module 216 is configured to dynamically update all presentation interfaces of the browser application, in real-time, such that all open presentation interfaces present the same interactive data for a current chat/messaging session, a current online shopping session, and/or a current online appointment-setting session for a user that is not logged in to a particular online system. The real-time updating module 216 is configured to use the broadcast pipeline to provide updates to a master presentation interface from one or more slave presentation interfaces, and to provide updates to a set of slave interfaces from a master presentation interface.

The display device 218 is configured to display various icons, text, and/or graphical elements associated with a browser application and a plurality of presentation interfaces for the client device 200. In an exemplary embodiment, the display device 218 is communicatively coupled to the user interface 206 and the at least one processor 202. The at least one processor 202, the user interface 206, and the display device 218 are cooperatively configured to display, render, or otherwise convey one or more graphical representations or images associated with the browser application and a plurality of presentation interfaces on the display device 218, as described in greater detail below. In an exemplary embodiment, the display device 218 is realized as an electronic display configured to graphically display browser application data and presentation interface data, as described herein. In some embodiments, the display device 218 is implemented as a display screen of a standalone, personal computing device (e.g., laptop computer, tablet computer). It will be appreciated that although the display device 218 may be implemented using a single display, certain embodiments may use additional displays (i.e., a plurality of displays) to accomplish the functionality of the display device 218 described herein.

Figure 3:
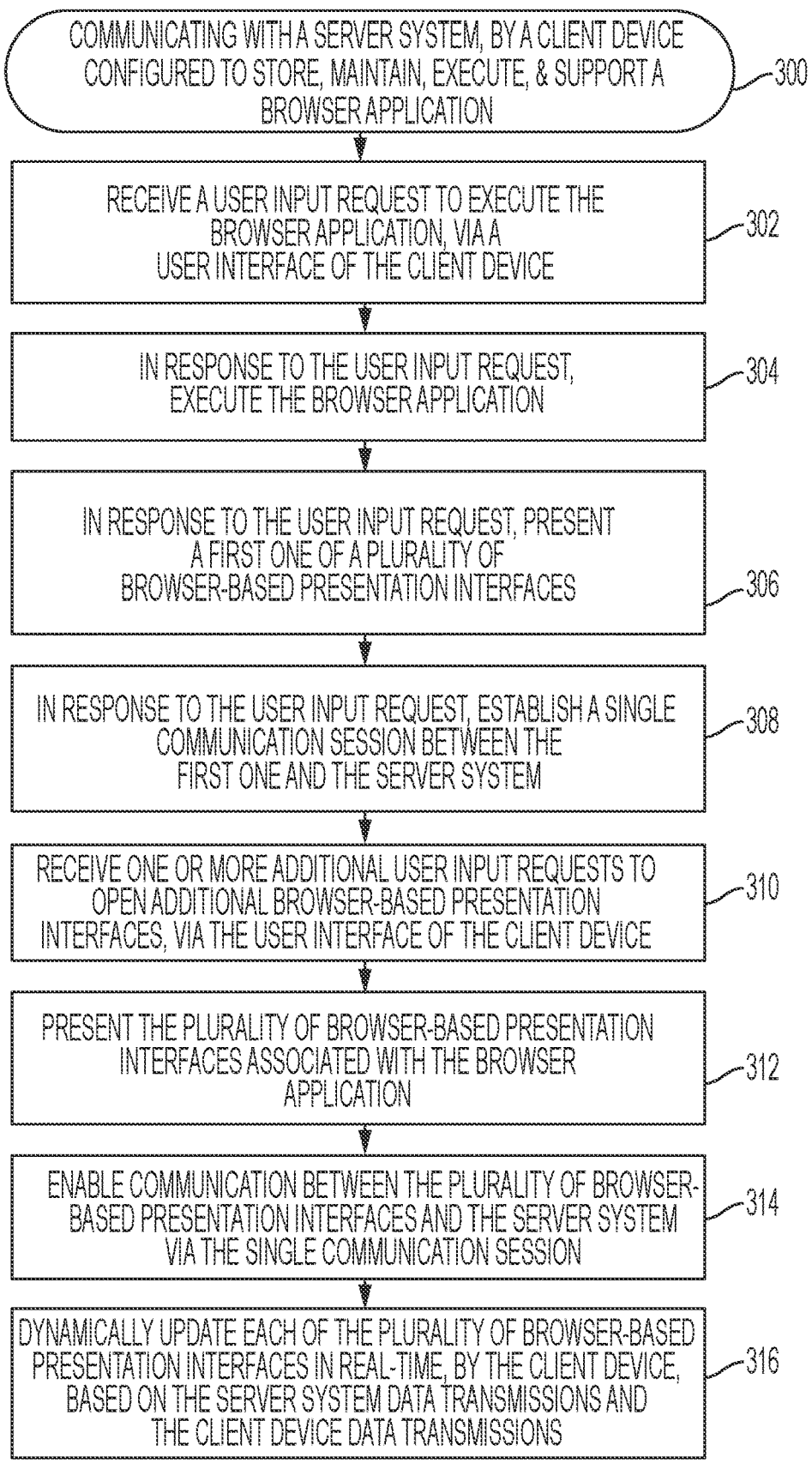
FIG. 3 is a flow chart that illustrates an embodiment of a process for communicating with a server system, by a client device configured to store, maintain, execute, and support a browser application, in accordance with the disclosed embodiments.

FIG. 3 is a flow chart that illustrates an embodiment of a process 300 for communicating with a server system, by a client device configured to store, maintain, execute, and support a browser application, in accordance with the disclosed embodiments. For ease of description and clarity, it is assumed that the process 300 begins by receiving a user input request to execute the browser application, via a user interface of the client device (step 302). As described herein, the client device is implemented as a computer system that is in communication with one or more servers (e.g., server system 106 of FIG. 1), and the user input request may be received via an applicable touchscreen or other hardware element communicatively coupled to the client device (e.g., user interface 206 of FIG. 2). The user input request to execute the browser application may be a user selection of a graphical element, a menu option, a data input field, or the like.

In response to the received user input request (step 302), the process 300 executes the browser application, by the client device (step 304); presents a first one of a plurality of browser-based presentation interfaces, by a display element of the client device (step 306); and establishes a single communication session between the first one and the server system, via a communication element or device of the client device (step 308). Generally, the user executes the browser by selecting a graphical element representing the browser, via a user interface of the client device, wherein the graphical element is presented by the client device. The process 300 presents a browser-based presentation interface comprising a graphical user interface (GUI) associated with the browser application, the GUI configured to present a document or panel that includes website data, text-based elements, graphical elements, user-selectable elements (e.g., menus, hyperlinks), and any other web-based, visually-presented graphic or text element configured to convey website data and/or to receive user input data.

As described herein, a browser-based presentation interface is generally implemented as a browser window or a browser tab. Browser windows and tabs are well-known and commonly-used presentation interfaces for user interaction with a computer system (e.g., the client device). Browser windows and browser tabs are two-dimensional graphical control elements that include a visual presentation area (i.e., document or panel) surrounded by a frame, wherein the frame generally includes one or more graphical elements for user manipulation to move and resize the window or tab. Browser windows and tabs are typically rectangular in shape, to accommodate a typically shaped display device (e.g., reference 218 of FIG. 2). Browser windows can be moved, expanded to fill an entire display area of a display device (e.g., reference 218 of FIG. 2), resized, hidden and restored, closed, and can overlap (partial overlap or complete overlap) with other browser windows presented by the display device. Browser tabs are similar in form and function to browser windows, but browser tabs provide functionality to allow multiple documents or panels to be included and presented as part of a single browser window, wherein each tab is used as a navigational widget for user-selection to switch between the documents or panels (i.e., switch between the tabs).

Here, the process 300 receives the user input command to execute the browser application (step 302), executes the browser application and presents a browser-based presentation interface, such as a browser window or a browser tab inside a browser window (steps 304, 306), and establishes a single communication session between the browser window or browser tab and the server system (step 308). As described herein, each browser window tab communicates with one or more servers (e.g., server system 106 of FIG. 1) via a communication session. A communication session is a data transfer thread between the server system and a particular aspect of the client device which receives server-based data via the communication session. Each browser window or browser tab (presented as part of the executed browser application) is an aspect of the client device capable of initiating, maintaining, and using an individually identifiable communication session for transmitting data messages to, and receiving data messages from, the server system. Here, each data message exchanged between the server system and the browser window or browser tab is associated with a session identifier (i.e., a session ID), which differentiates session communications for various communication sessions, thus enabling the server system to communicate with a plurality of aspects of various client devices simultaneously and to keep each communication session separate and distinct.

After establishing the single communication session between the first browser-based presentation interface (step 308), the process 300 receives one or more additional user input requests to open additional browser-based presentation interfaces, via the user interface of the client device (step 310), and presents the plurality of browser-based presentation interfaces associated with the browser application (step 312). The user input requests to open additional browser-based presentation interfaces may include requests to open additional browser windows, requests to open additional browser tabs in the same browser window, or requests to open a combination of both browser windows and browser tabs. Here, the process 300 receives a user request to present at least a second presentation interface, in addition to the first presentation interface associated with the single communication session, and simultaneously presents the first presentation interface and at least the second presentation interface via the display element (e.g., reference 218 of FIG. 2) of the client device (e.g., reference 102 of FIG. 1, reference 200 of FIG. 2).

The process 300 then enables communication between the plurality of browser-based presentation interfaces and the server system via the single communication session (step 314), wherein the communication comprises server system data transmissions received by the client device via the single communication session and client device data transmissions transmitted by the client device. Suitable methodologies for enabling communication between a plurality of browser-based presentation interfaces and the server system via the single communication session is described below with regard to FIGS. 4 and 6. Under typical circumstances in prior art solutions, each presentation interface (e.g., browser window or tab) initiates, maintains, and uses a unique communication session associated with a unique communication session identifier to communicate with the server system. However, here the process 300 establishes one and only one communication session between the first presentation interface of the executed browser application (step 308), the process 300 opens one or more secondary presentation interfaces (step 312), and then the process 300 enables the secondary presentation interfaces to use the first communication session to exchange data messages with the server system (step 314). Thus, the process 300 establishes a single, individual communication session between the client device and the server system, and permits the plurality of browser tabs and browser windows to use the same communication session for server communications. Further, the process 300 establishes the one single individual communication session as part of a browser-based, client-side solution that is stored, maintained, executed, and supported by the client device using the browser application. In this scenario, the client device provides the server the ability to support multiple browser windows and/or browser tabs using a single communication thread with the client device.

After enabling communication between the plurality of browser-based presentation interfaces and the server system via the single communication session (step 314), the process 300 dynamically updates each of the plurality of browser-based presentation interfaces in real-time, by the client device, based on the server system data transmissions and the client device data transmissions (step 316). Each presentation interface is typically updated or changed in some way when a user interacts with the presentation interface via the client device, or when a server communication is received by the client device. However, in the prior art situation where a plurality of browser windows or browser tabs are simultaneously open and each window or tab maintains a separate communication session, the browser window or browser tab in current use (i.e., the active window or tab currently in use by a user) is generally the only browser window or tab that is updated when user interactions or server data transmissions are received by the client device. Here, the process 300 does not limit updates to an active window or tab. Instead, the process 300 dynamically updates all of the open and displayed presentation interfaces when user input client device data and/or server system data transmissions are received. Thus, the process 300 permits all of the open and displayed presentation interfaces to present the same current and updated information.

Figure 4:
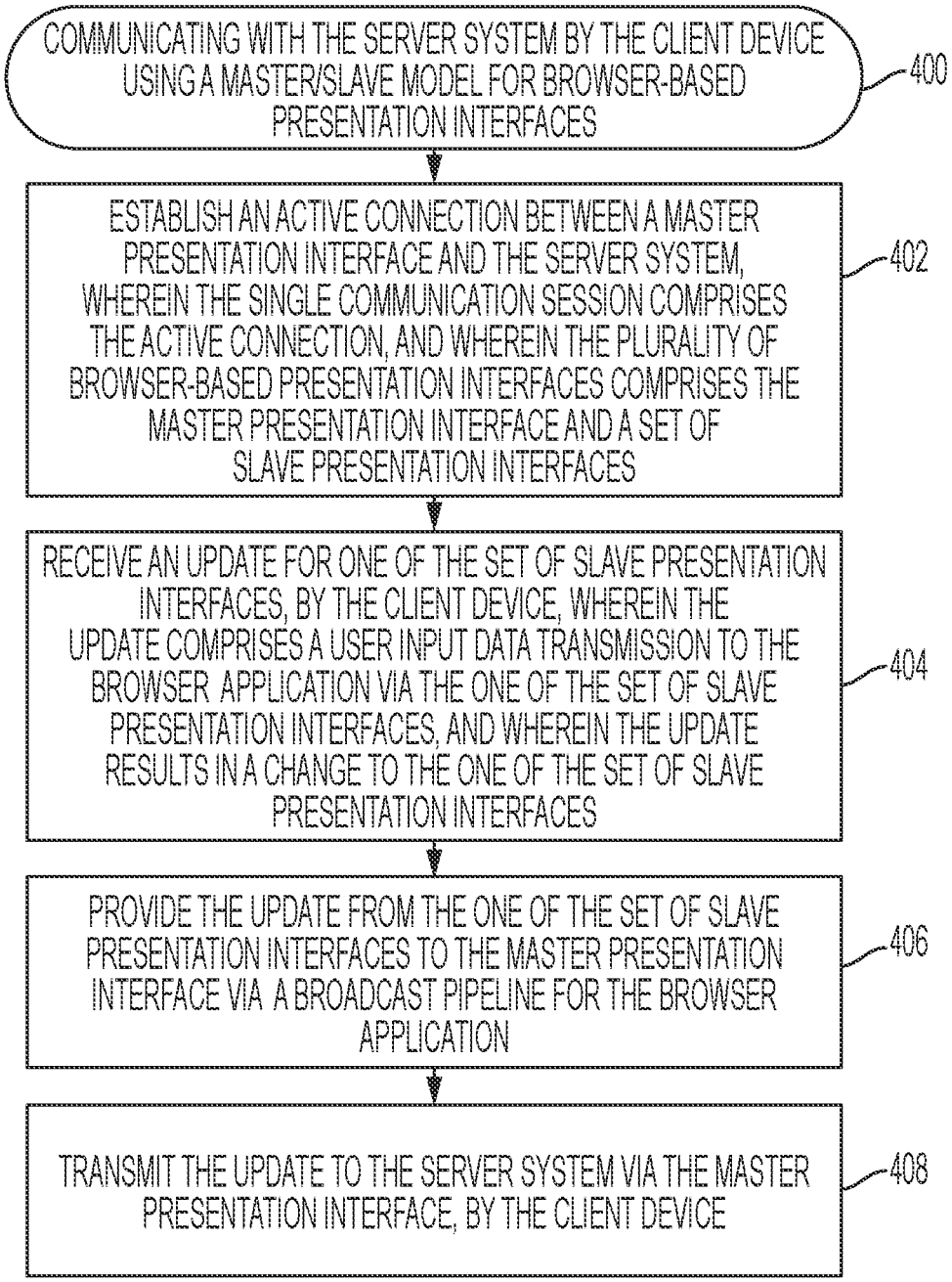
FIG. 4 is a flow chart that illustrates an embodiment of a process for communicating with the server system by the client device using a master/slave model for browser-based presentation interfaces, in accordance with the disclosed embodiments.
Figure 6:
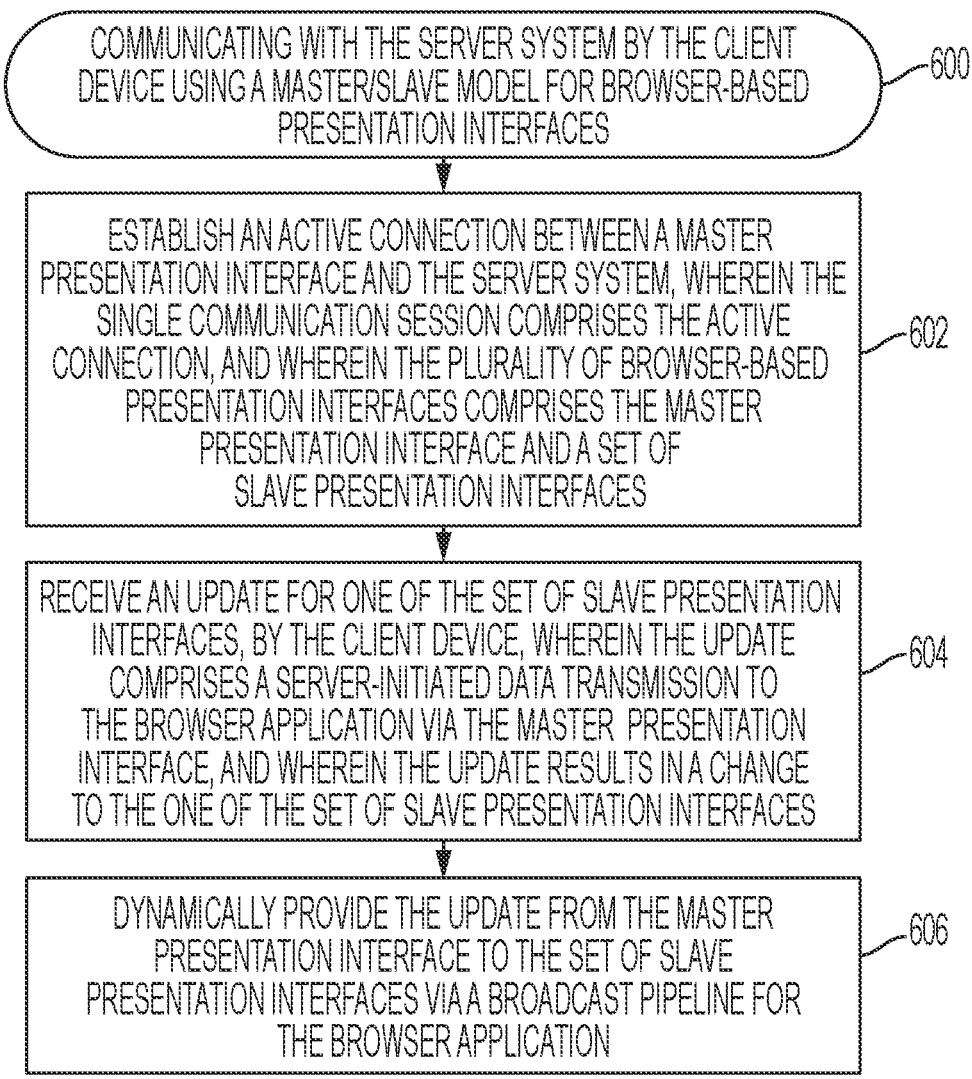
FIG. 6 is a flow chart that illustrates a second embodiment of a process for communicating with the server system by the client device using a master/slave model for browser-based presentation interfaces, in accordance with the disclosed embodiments.

FIG. 4 is a flow chart that illustrates an embodiment of a process 400 for communicating with the server system by the client device using a master/slave model for browser-based presentation interfaces, in accordance with the disclosed embodiments. The process 400 described in FIG. 4 represents one embodiment of step 314 described above in the discussion of FIG. 3, including additional detail. It should be noted that FIGS. 4 and 6 are related processes, and processes 400 and 600 detail the functionality of the master presentation interface when used as an "intermediary" to facilitate communications between a slave presentation interface and a server system. Here, FIG. 4 describes the functionality of the master presentation interface to receive slave-broadcasted communications and to provide the slave-broadcasted communications to a server system. FIG. 6 describes the functionality of the master presentation interface to receive server-transmitted communications and to provide the server-based communications to any applicable slave presentation interfaces.

First, the process 400 establishes an active connection between a master presentation interface and the server system (step 402). The active connection is one single, individual communication session using one single, individual session identifier, for use by more than one presentation interface (e.g., a plurality of browser windows and/or browser tabs presented by the browser application of the client device). The client device uses a master/slave model for browser-based presentation interfaces, wherein the plurality of browser-based presentation interfaces comprises a master presentation interface and a set of slave presentation interfaces. The process 400 establishes the active connection between the master presentation interface and the server system, such that the set of slave presentation interfaces can also communicate with the server system using the active connection, in an indirect way via the master presentation interface.

The process 400 then receives an update for one of the set of slave presentation interfaces, by the client device (step 404). In this scenario, the update is a user input data transmission to the browser application via the one of the set of slave presentation interfaces, and the update results in a change to the one of the set of slave presentation interfaces. In other words, a browser window or browser tab that is not the "master" (i.e., the browser window or tab does not have an active connection to the server system) receives a user input update. The user input update may be any form of user interaction with the browser window or tab, such as a user selection of a graphical element presented by the browser window or tab, user input text to a data field or messaging/chat interface presented by the browser window or tab, or the like.

After receiving the update (step 404), the process 400 provides the update from the one of the set of slave presentation interfaces to the master presentation interface via a broadcast pipeline for the browser application (step 406). One suitable methodology for providing an update from a slave presentation interface to a master presentation interface is described below with reference to FIG. 5. The broadcast pipeline is a browser-based, client-side solution enabling presentation interfaces of the browser application to communicate with other presentation interfaces of the browser application. For example, the above-described master presentation interface can communicate with any of the set of slave presentation interfaces using the broadcast pipeline. As another example, any one of the set of slave presentation interfaces can communicate with the master presentation interface using the broadcast pipeline.

After providing the update to the master presentation interface via the broadcast pipeline (step 406), the process 400 then transmits the update to the server system via the master presentation interface, by the client device (step 408). As described previously, the master presentation interface has established an active connection to the server system (step 402), and there exists only one single, individual communication session between the client device and the server system (see FIG. 3). Here, the slave presentation interface of the browser application has been updated, or in other words, a user has interacted with the browser and provided data input. The slave presentation interface does not have an established communication connection to the server system, because a second communication connection to the server system would be a separate and distinct communication thread associated with a different session identifier, which would require the server system to simultaneously establish and use multiple communication threads. However, instead of requiring the server system to accommodate more than one presentation interface by creating multiple communication threads on the server-side, the process 400 accommodates more than one presentation interface on the client-side by implementing and using the client-side, browser-based solution that includes the master/slave model, as described herein. Thus, using the broadcast pipeline, any one of the slave presentation interfaces is capable of communicating with the server system indirectly, by transmitting and receiving data messages via the master presentation interface that has an active connection to the server system.

Figure 5:
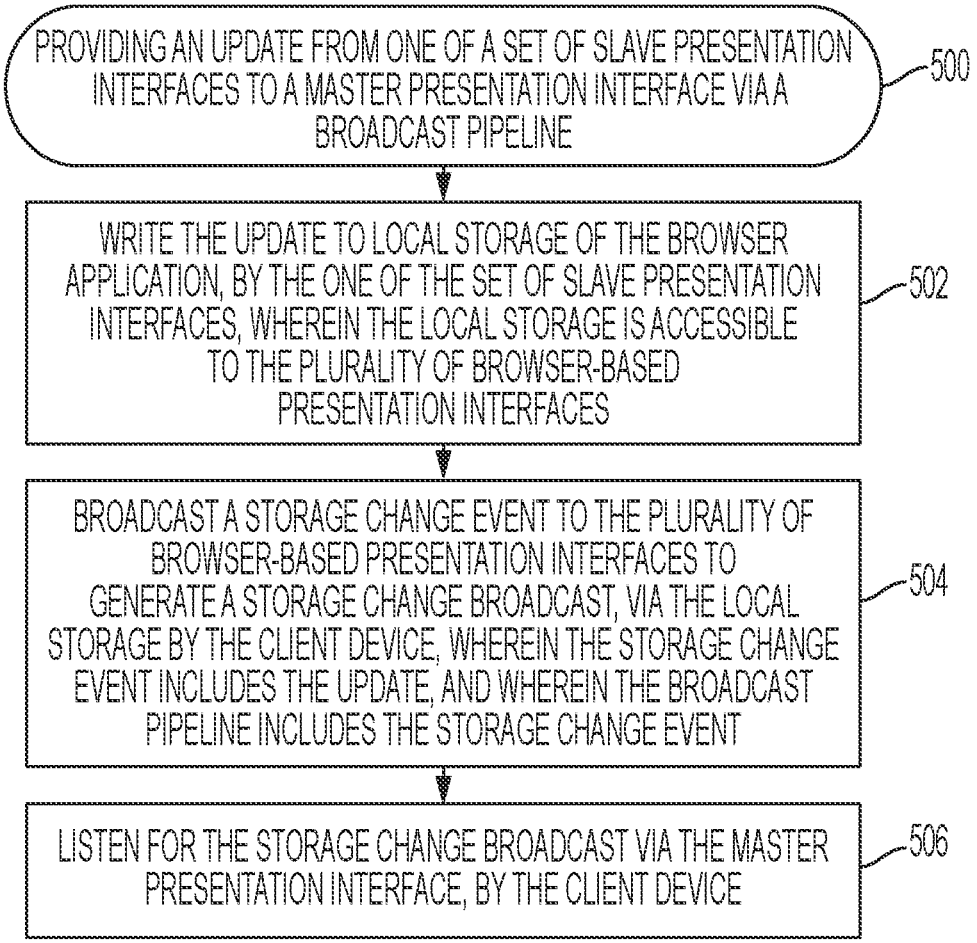
FIG. 5 is a flow chart that illustrates an embodiment of a process for providing an update from one set of slave presentation interfaces to a master presentation interface via a broadcast pipeline, in accordance with the disclosed embodiments.

FIG. 5 is a flow chart that illustrates an embodiment of a process 500 for providing an update from one set of slave presentation interfaces to a master presentation interface via a broadcast pipeline, in accordance with the disclosed embodiments. It should be appreciated that the process 500 described in FIG. 5 represents one embodiment of step 406 described above in the discussion of FIG. 4, including additional detail. First, the process 500 writes the update to local storage of a browser application, by the one of the set of slave presentation interfaces, wherein the local storage is accessible to the plurality of browser-based interfaces (step 502). The process 500 then broadcasts a storage change event to the plurality of browser-based presentation interfaces to generate a storage change broadcast, via the local storage by the client device, wherein the storage change event includes the update, and wherein the broadcast pipeline includes the storage change event (step 504). Typically, after a browser tab or browser window writes to local storage of the browser application, the local storage broadcasts a storage change event to all tabs or windows of the browser application. Thus, the process 500 uses the storage event mechanism of the browser application to create a broadcast channel or broadcast pipeline between the open browser-based presentation interfaces (e.g., browser windows, browser tabs).

The process 500 listens for the storage change broadcast via the master presentation interface, by the client device (step 506). When the presentation interface writes to the local storage, the storage change event is broadcast to all open tabs and windows (i.e., all open presentation interfaces). However, all open tabs and windows of the browser application do not necessarily receive the storage change event data. Instead, particular tabs or windows of the browser application are configured to listen for the storage change event, and to receive the storage change event data from the broadcasting presentation interface. In the example described with regard to FIG. 5, the broadcasting presentation interface is a slave presentation interface that has already received an update comprising a user input data transmission and the listening presentation interface is the master presentation interface. Thus, the process 500 receives a user input data update for the browser application via a slave tab/window, and then the slave tab/window communicates the data update to the master tab/window via the broadcast pipeline to which the master is listening for the data update. The master presentation interface is then able to transmit the update to the server system (see reference 408 of FIG. 4) via the active connection between the master presentation interface and the server system (see reference 402 of FIG. 4).

FIG. 6 is a flow chart that illustrates a second embodiment of a process 600 for communicating with the server system by the client device using a master/slave model for browser-based presentation interfaces, in accordance with the disclosed embodiments. The process 600 described in FIG. 6 represents one embodiment of step 314 described above in the discussion of FIG. 3, including additional detail. It should be noted that FIGS. 4 and 6 are related processes, and processes 400 and 600 detail the functionality of the master presentation interface when used as an "intermediary" to facilitate communications between a slave presentation interface and a server system. Here, FIG. 6 describes the functionality of the master presentation interface to receive server-transmitted communications and to provide the server-based communications to any applicable slave presentation interfaces. FIG. 4 describes the functionality of the master presentation interface to receive slave-broadcasted communications and to provide the slave-broadcasted communications to the server system.

First, the process 600 establishes an active connection between the master presentation interface and the server system (step 602). As described previously with regard to FIG. 4, the active connection is one single, individual communication session using one single, individual session identifier, for use by more than one presentation interface (e.g., a plurality of browser windows and/or browser tabs presented by the browser application of the client device). The client device uses a master/slave model for browser-based presentation interfaces, wherein the plurality of browser-based presentation interfaces comprises a master presentation interface and a set of slave presentation interfaces. The process 600 establishes the active connection between the master presentation interface and the server system, such that the set of slave presentation interfaces can also communicate with the server system using the active connection, in an indirect way via the master presentation interface.

The process 600 then receives an update for one of the set of slave presentation interfaces, by the client device, wherein the update comprises a server-initiated data transmission to the browser application via the master presentation interface, and wherein the update results in a change to the one of the set of slave presentation interfaces (step 604). In this scenario, the update is a server-initiated data transmission to the browser application, which has been provided by the server system, and the update results in a change to the one of the set of slave presentation interfaces. In other words, a "master" browser window or browser tab (i.e., the browser window or tab that has an active connection to the server system) receives a data transmission from the server system. The data transmission is an update for an active slave presentation interface that is currently in use by a user of the client device. The server-transmitted update may be a response to, or the result of, any form of user input interaction with the browser window or tab. For example, a user may select (via user interface of the client device) a graphical element presented by the browser window or tab. As another example, the client device user may provide user input text to a data field of the browser window or tab. As a third example, the client device user may provide input to a messaging or chat interface presented by the browser window or tab.

After receiving the update (step 604), the process 600 dynamically provides the update from the master presentation interface to the set of slave presentation interfaces via a broadcast pipeline for the browser application (step 606). One suitable methodology for dynamically providing an update from a master presentation interface to a set of slave presentation interfaces is described below with reference to FIG. 7. As described previously with regard to FIG. 4, the broadcast pipeline is a browser-based, client-side solution enabling presentation interfaces of the browser application to communicate with other presentation interfaces of the browser application. For example, the above-described master presentation interface can communicate with any of the set of slave presentation interfaces using the broadcast pipeline. As another example, any one of the set of slave presentation interfaces can communicate with the master presentation interface using the broadcast pipeline. Here, the master presentation interface communicates updates to the set of slave presentation interfaces dynamically and in real-time, as each update is received by the master presentation interface from the server system (described previously with regard to step 604).

Figure 7:
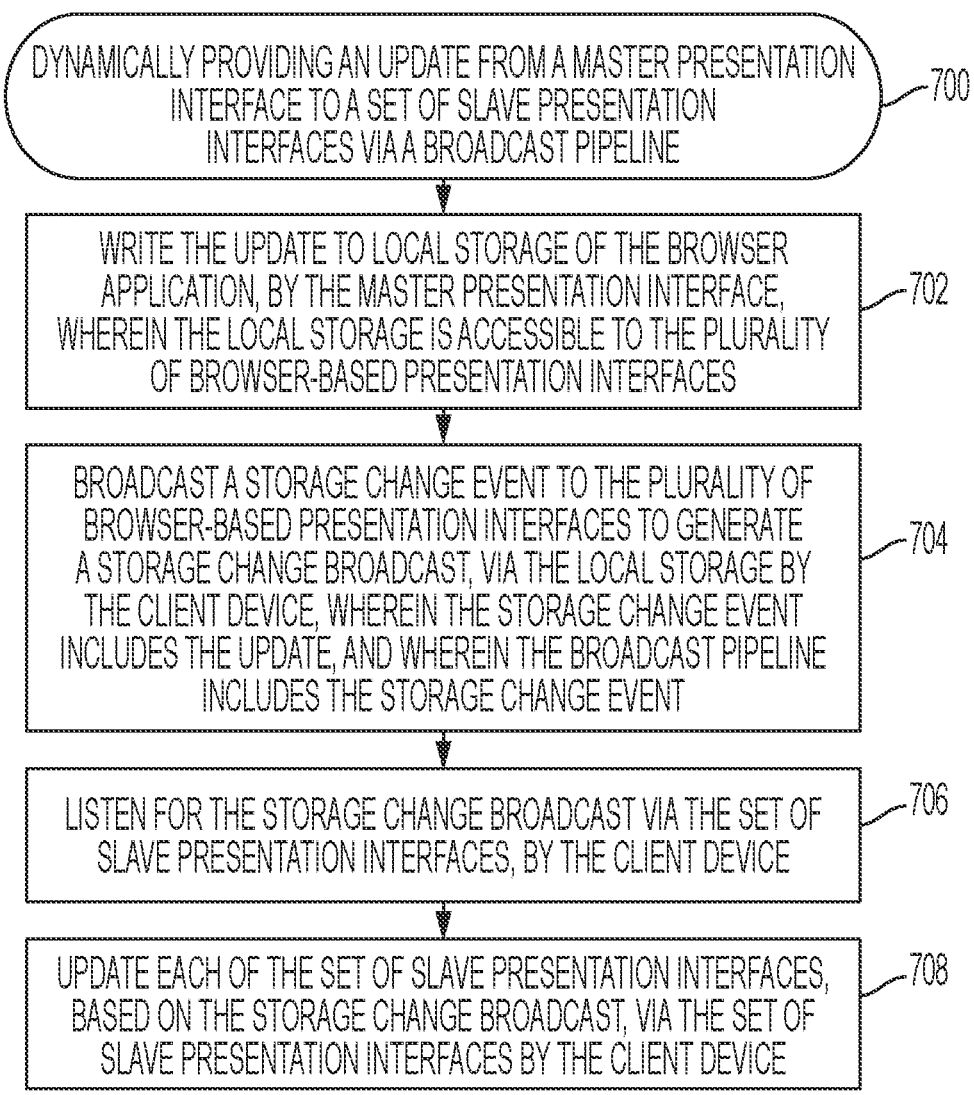
FIG. 7 is a flow chart that illustrates an embodiment of a process for dynamically providing an update from a master presentation interface to a set of slave presentation interfaces via a broadcast pipeline, in accordance with the disclosed embodiments.

FIG. 7 is a flow chart that illustrates an embodiment of a process 700 for dynamically providing an update from a master presentation interface to a set of slave presentation interfaces via a broadcast pipeline, in accordance with the disclosed embodiments. The process 700 described in FIG. 7 represents one embodiment of step 606 described above in the discussion of FIG. 6, including additional detail.

First, the process 700 writes the update to local storage of the browser application, by the master presentation interface, wherein the local storage is accessible to the plurality of browser-based interfaces (step 702). The process 700 then broadcasts a storage change event to the plurality of browser-based presentation interfaces to generate a storage change broadcast, via the local storage by the client device, wherein the storage change event includes the update, and wherein the broadcast pipeline includes the storage change event (step 704). As described previously with regard to FIG. 5, typically, after a browser tab or browser window writes to local storage of the browser application, the local storage broadcasts a storage change event to all tabs or windows of the browser application. Thus, the process 700 uses the storage event mechanism of the browser application to create a broadcast channel or broadcast pipeline between the open browser-based presentation interfaces (e.g., browser windows, browser tabs).

The process 700 listens for the storage change broadcast via the set of slave presentation interfaces, by the client device (step 706). When any of the presentation interfaces writes to the local storage, the storage change event is broadcast to all open tabs and windows (i.e., all open presentation interfaces). However, all open tabs and windows of the browser application do not necessarily receive the storage change event data. Instead, particular tabs or windows of the browser application are configured to listen for the storage change event, and to receive the storage change event data from the broadcasting presentation interface. In the example described with regard to FIG. 7, the broadcasting presentation interface is the master presentation interface that has already received an update comprising a server-initiated data transmission and the listening presentation interfaces are the set of slave presentation interfaces. The process 700 then updates each of the set of slave presentation interfaces, based on the storage change broadcast, via the set of slave presentation interfaces by the client device (step 708). Thus, the process 700 receives a server-initiated data update for the browser application via a master tab/window, and then the master tab/window communicates the data update to the set of slave tabs/windows via the broadcast pipeline to which the set of slave presentation interfaces are listening for the data update. The set of slave presentation interfaces are then updated to present the update via a display element of the client device (see reference 218 of FIG. 2).

It should be noted that FIGS. 5 and 7 are related processes, and processes 500 and 700 detail the use of the broadcast pipeline of the browser application to communicate between presentation interfaces (e.g., windows, tabs) of the browser application. As described herein, a presentation interface may be a "master" (i.e., a first browser window/tab opened by a user that establishes an active communication session with one or more remote servers) or a "slave" (i.e., a browser window/tab opened by a user after the master tab is opened, and which communicates with the one or more remote servers via the active communication session maintained by the master). Here, FIG. 7 describes the functionality of the master presentation interface that has already received a server-initiated and server-transmitted update for one particular, active slave presentation interface of the browser application, via the active communication session of the master presentation interface. The process 700 describes the steps taken by the master presentation interface to act as an intermediary facilitating communication exchange between the one or more servers, by providing the server communications (i.e., the updates) to the applicable slave presentation interface. Further, the master presentation interface not only provides server-transmitted updates and user input updates to the applicable slave presentation interface, but the master presentation interface also provides the updates (e.g., server-transmitted updates and user input updates) to all open presentation interfaces of the browser application (i.e., all of the slave interfaces associated with the active communication session maintained by the master), such that each of the slave presentation interfaces is dynamically updated in a duplicate manner. Thus, each of the presentation interfaces presents the same updated information, in real-time. FIG. 5 differs from FIG. 7 in the applicable presentation interface using the broadcast pipeline to transmit received data updates to other presentation interfaces of the browser application. FIG. 5 describes the functionality of a slave presentation interface communicating a user input update to the master presentation interface of the browser application, such that the master presentation interface is capable of transmitting the user input update to the one or more servers communicating with the master presentation interface via an active communication session maintained by the master presentation interface.

Embodiment: Client Device Participates in a Chat Session

Figure 8A:
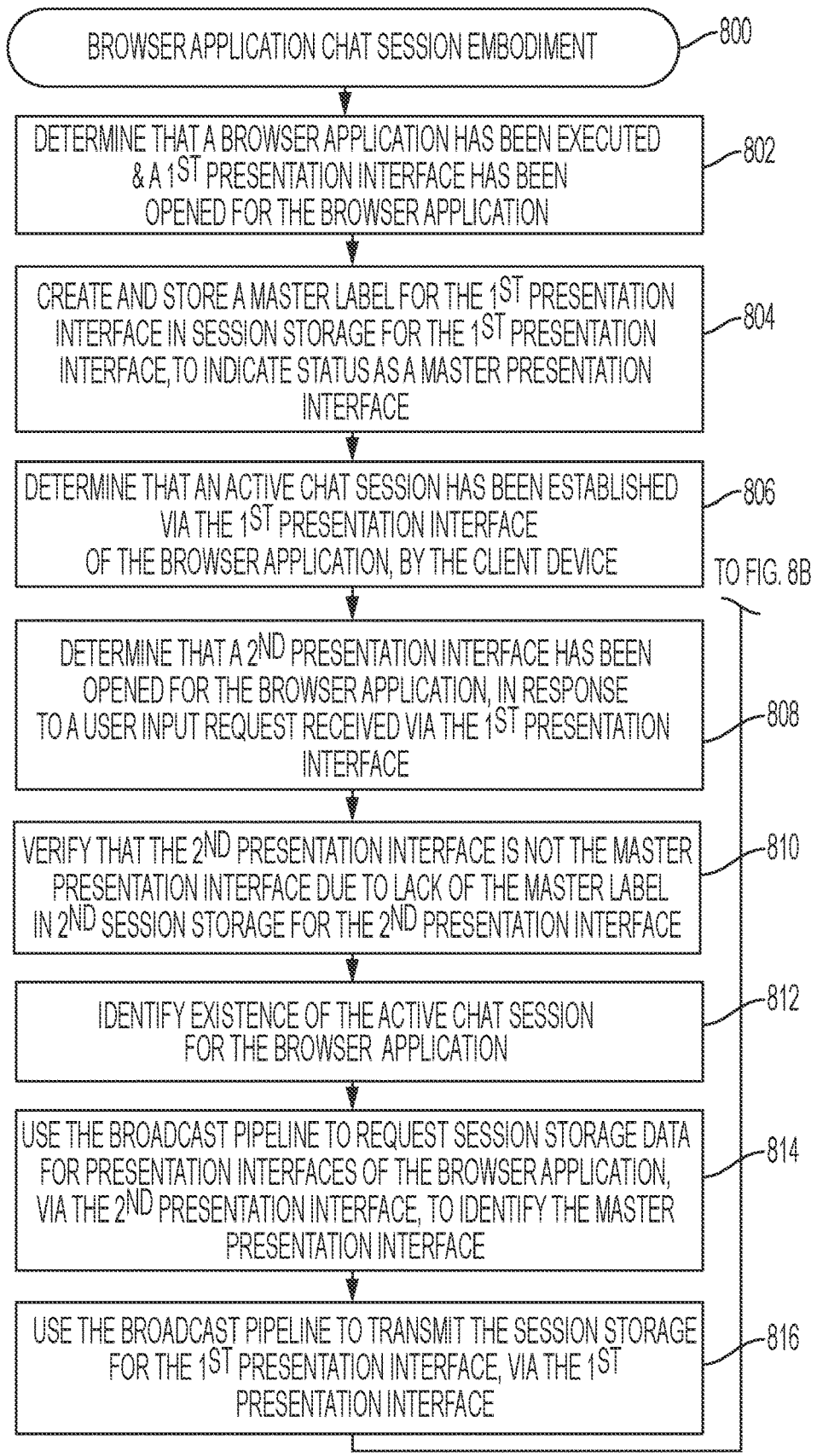
FIGS. 8A-8B are flow charts that illustrate an embodiment of a process for exchanging client device communications with a server system, via a browser application configured to support a messaging or "chat" session, in accordance with the disclosed embodiments.
Figure 8B:
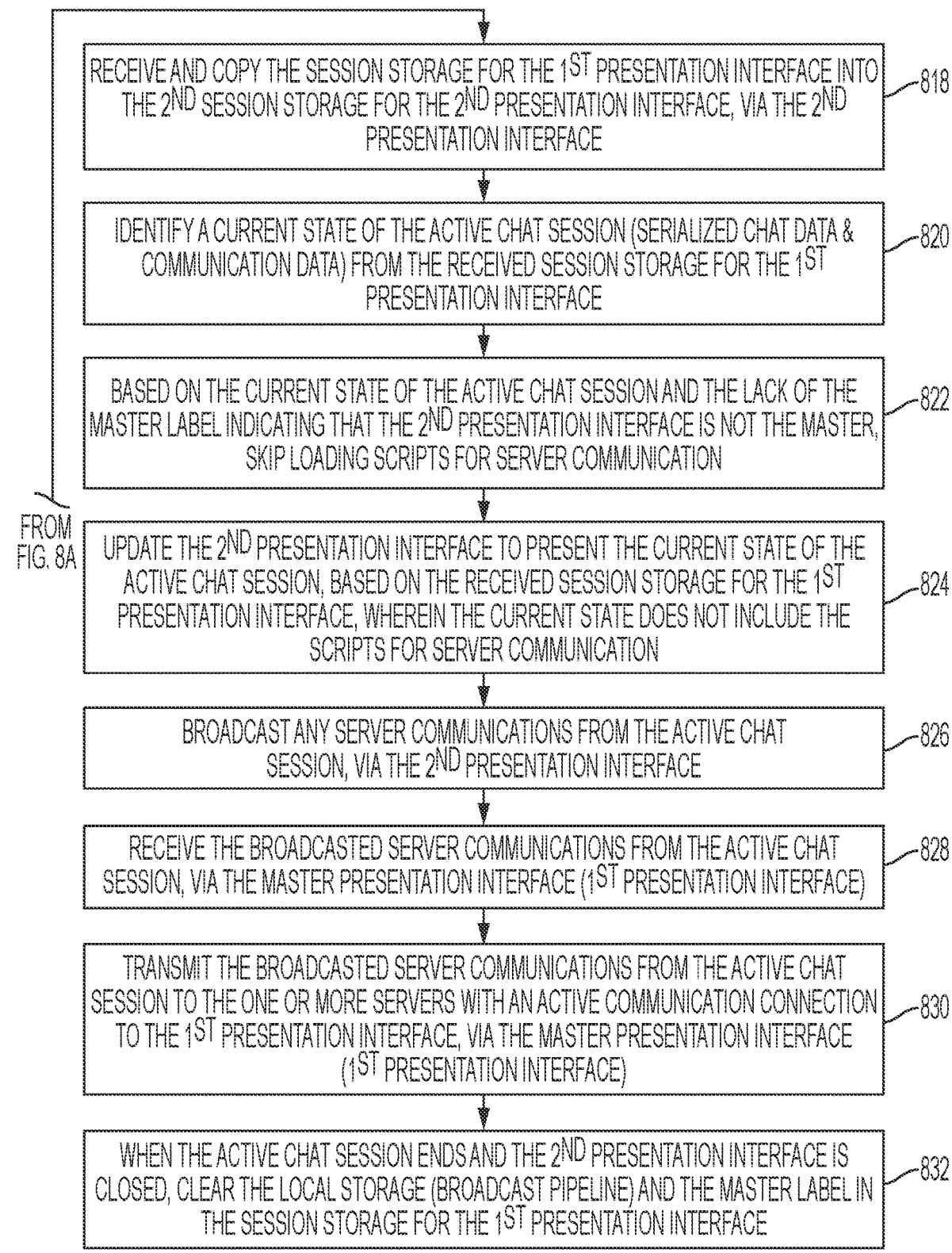

FIGS. 8A-8B are flow charts that illustrate an embodiment of a process 800 for exchanging client device communications with a server system, via a browser application configured to support a messaging or "chat" session. The process 800 is one particular embodiment of the process 300 described previously with regard to FIG. 3, wherein the presentation interfaces of the browser application are used by a client device user to participate in a chat session using a messaging widget, icon-based user interface, mini "app" (i.e., application), or other graphical element provided by presentation interfaces associated with the browser application.

First, the process 800 determines that the browser application has been executed and a first presentation interface has been opened for the browser application (step 802). As described herein a presentation interface is a browser tab or browser window, and during typical operation, the process 800 detects that a user has initiated execution of the browser application via a user interface of the client device and, in response, the client device has executed the browser application and opens and displays the first presentation interface for the browser application.

The process 800 then creates and stores a master label for the first presentation interface in session storage for the first presentation interface, to indicate status as a master presentation interface (step 804). The browser application provides one or more presentation interfaces for user viewing and interaction. A presentation interface is a graphical user interface (GUI) for user interaction with various websites and other web-based material (e.g., documents, panels, hyperlinks, graphical elements, text, images, data) presented by one or more remotely located servers via the internet and/or via an intranet. The browser application presents at least one presentation interface, but is also is generally configured to permit the user to open additional presentation interfaces (e.g., additional browser tabs and/or additional browser windows) during use. As described herein, the first presentation interface is designated as the "master" presentation interface which establishes an active communication session with the one or more remote servers, wherein the active communication session is associated with a particular identifier. Any additional presentation interfaces opened by the user via the client device, after and in addition to the first presentation interface, are referred to as "slave" presentation interfaces. As described herein, the slave presentation interfaces differ from the master presentation interface in that the slave presentation interfaces do not establish independent communication sessions with the one or more remote servers. Instead, the slave presentation interfaces communicate with the one or more remote servers via the active communication session associated with the master presentation interface. In this way, all presentation interfaces of the browser application communicate with the server using one single, individual browser-based communication session established on the client-side, thereby eliminating any need for multi-threading communications on the server-side.

The master label is stored in the session storage for the first presentation interface. Session storage is associated with one particular browser tab or browser window, and is accessible only to the one particular browser tab or browser window. Here, the process 800 creates a distinction for the master presentation interface, such that the master can be distinguished from any of the set of slave presentation interfaces associated with the browser application. The master label may be any indication that the first presentation interface is the master presentation interface for the browser application, including a tag, notation, label, flag, variable setting, and/or any other indication which may be stored and maintained in the session storage of the first presentation interface.

Next, the process 800 determines that an active chat session has been established via the first presentation interface of the browser application, by the client device (step 806). The active chat session may be any messaging-based application or website functionality displayed and provided by the first presentation interface. In this scenario, the active chat session is associated with a particular website currently being accessed by the client device via the first presentation interface.

The process 800 then determines that a second presentation interface has been opened for the browser application, in response to a user input request received via the first presentation interface (step 808). Here, the process 800 detects that the user has opened another browser tab or browser window, in addition to the currently-open first browser tab or first browser window (i.e., the first presentation interface).

The process 800 verifies that the second presentation interface is not the master presentation interface due to lack of the master label in second session storage for the second presentation interface (step 810). The process 800 evaluates the data stored in session storage for the second presentation interface, and determines whether a master label is included in the session storage. However, there is one and only one master presentation interface at a time for the browser application. In this scenario, the master label is stored in the session storage for the first presentation interface, indicating that the master presentation interface is the first presentation interface. Here, the process 800 determines that the session storage for the second presentation interface does not include the master label.

The process 800 also identifies existence of the active chat session for the browser application (step 812). When a chat session or other type of messaging application is activated by the client device (generally in response to a user input request), the process 800 stores an indicator of the active chat session in a local storage for the browser application. The local storage is accessible to all presentation interfaces of the browser application, and thus the active chat sessions indicator is accessible to the process 800 via the second presentation interface.

Due to the existence of the active chat session, the process 800 uses the broadcast pipeline to request session storage data for presentation interfaces of the browser application, via the second presentation interface, to identify the master presentation interface (step 814). Here, the second presentation interface is a new browser tab or new browser window that has been opened by the client device in response to a user input command. The process 800 is aware that the second presentation interface is not the master presentation interface, and thus, the second presentation interface must be a slave presentation interface that communicates with one or more servers using a master presentation interface as an intermediary. Here, the process 800 requests session storage data from any other presentation interface of the browser application, via the second presentation interface, such that the second presentation interface can identify the master presentation interface.

The process 800 uses the broadcast pipeline to transmit the session storage for the first presentation interface, via the first presentation interface (step 816). In this example, the process 800 identifies the first presentation interface as the master presentation interface by requesting and receiving the session storage for the first presentation interface, which includes the master label that indicates the status as the master presentation interface. Generally, requesting and receiving the session storage is performed using the broadcast pipeline, which is described previously with regard to FIGS. 4-7. The process 800 receives and copies the session storage for the first presentation interface into the second session storage for the second presentation interface, via the second presentation interface (step 818). The process 800 also identifies a current state of the active chat session (e.g., serialized chat data and communication data) from the received session storage for the first presentation interface (step 820). The session storage for the first presentation interface (i.e., the master presentation interface) includes a master label and a current state of the active chat session that includes serialized chat data and communication connection data for the active communication session with the remote servers. Here, the process 800 copies the session storage for the first presentation interface into the session storage for the second presentation interface, such that the second presentation interface may duplicate and present the same chat session that is currently being presented by the first presentation interface. In this way, both of the first presentation interface and the second presentation interface are capable of displaying the same chat window or messaging application, wherein both of the first presentation interface and the second presentation interface are dynamically updated in real-time.

Based on the current state of the active chat session and the lack of the master label (wherein the lack indicates that the second presentation interface is not the master) the process 800 skips loading scripts for server communication (step 822). Here, the process 800 configures the chat window or messaging application such that data communication messages are not transmitted to the server system, by intentionally failing to load scripts that enable direct server communication from the slave presentation interface.

The process 800 updates the second presentation interface to present the current state of the active chat session, based on the received session storage for the first presentation interface, wherein the current state does not include the scripts for server communication (step 824). The current state of the active chat session is the same as the current state of the active chat session displayed by the first presentation interface, and both of the first presentation interface and the second presentation interface are dynamically updated in real-time, such that both presentation interfaces present the same chat data at the same time.

The process 800 broadcasts any data communications directed to the server system from the active chat session, via the second presentation interface (step 826). The process 800 receives the broadcasted server communications (i.e., communications directed to the server from the second presentation interface) from the active chat session, via the master presentation interface (step 828). In this scenario, the first presentation interface is the master presentation interface, which is indicated by the existence of the master label in the session storage of the first presentation interface, as described previously with regard to step 804. The process 800 transmits the broadcasted server communications from the active chat session to the one or more servers with an active communication connection to the first presentation interface, via the master presentation interface (step 830). As described previously, in this scenario the first presentation interface is the master presentation interface, which is indicated by the existence of the master label in the session storage of the first presentation interface. During the active chat session, the process 800 receives data communications from the server system via the master presentation interface that has an active communication session with the one or more servers, and the process 800 provides the received data communications originating from the server system to the slave presentation interface that is active and in current use for the chat application. The received communications are provided by the master presentation interface using the broadcast pipeline. Further, during the active chat session, the process 800 transmits data communications from the active chat session to the server system by broadcasting the data communications to the master presentation interface, and the master presentation interface proceeds to transmit the data communications from the active chat session to the server system.

When the active chat session ends and the second presentation interface is closed, the process 800 clears the local storage (which is used to exchange communications between presentation interfaces of the browser application via the broadcast pipeline) and clears the master label in the session storage for the first presentation interface (step 832).

The various tasks performed in connection with processes 300-800 may be performed by software, hardware, firmware, or any combination thereof. For illustrative purposes, the preceding descriptions of processes 300-800 may refer to elements mentioned above in connection with FIGS. 1-2. In practice, portions of processes 300-800 may be performed by different elements of the described system. It should be appreciated that processes 300-800 may include any number of additional or alternative tasks, the tasks shown in FIGS. 3-8 need not be performed in the illustrated order, and processes 300-800 may be incorporated into a more comprehensive procedure or process having additional functionality not described in detail herein. Moreover, one or more of the tasks shown in FIGS. 3-8 could be omitted from embodiments of processes 300-800 as long as the intended overall functionality remains intact.

Figure 9:
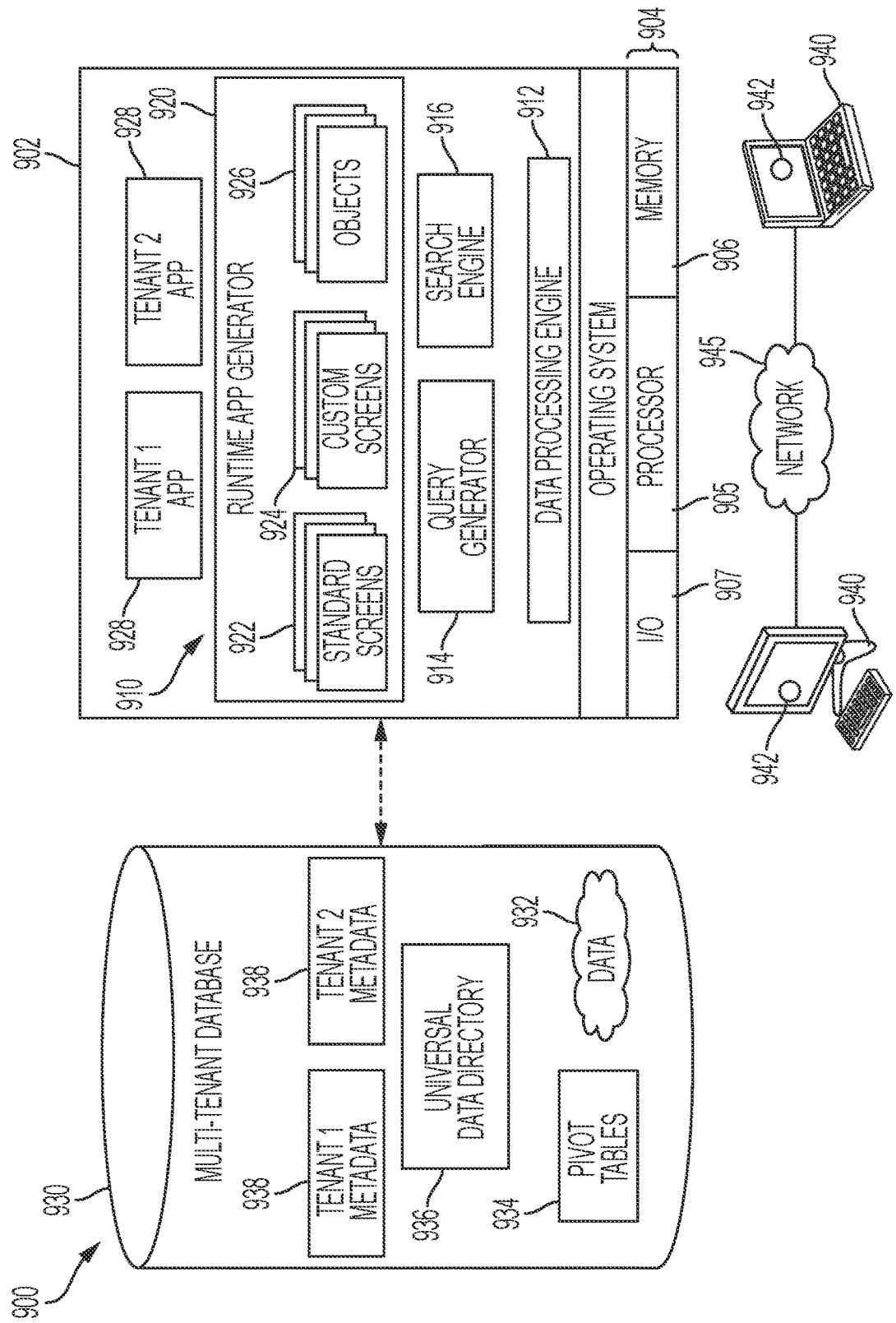
FIG. 9 is a block diagram of an exemplary multi-tenant database system suitable for use with the system of FIG. 1, in accordance with the disclosed embodiments.

FIG. 9 is a block diagram of an exemplary multi-tenant database system 900 suitable for use with the system 100 of FIG. 1, in accordance with the disclosed embodiments. The illustrated multi-tenant database system 900 of FIG. 9 includes a server 902 (e.g., server system 106) that dynamically creates and supports virtual applications 928 based upon data 932 from a common database 930 that is shared between multiple tenants, alternatively referred to herein as a multi-tenant database. Data and services generated by the virtual applications 928 are provided via a network 945 (e.g., data communication network 108) to any number of client devices 940 (e.g., client device 102, or the like), as desired. Each virtual application 928 is suitably generated at runtime (or on-demand) using a common application platform 910 that securely provides access to the data 932 in the database 930 for each of the various tenants subscribing to the multi-tenant system 900. In accordance with one non-limiting example, the multi-tenant system 900 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 930. In this regard, each tenant includes one or more users associated with, assigned to, or otherwise belonging to that respective tenant. To put it another way, each respective user within the multi-tenant system 900 is associated with, assigned to, or otherwise belongs to a particular tenant of the plurality of tenants supported by the multi-tenant system 900. Tenants may represent customers, customer departments, business or legal organizations, and/or any other entities that maintain data for particular sets of users within the multi-tenant system 900 (i.e., in the multi-tenant database 930). For example, the application server 902 may be associated with one or more tenants supported by the multi-tenant system 900. Although multiple tenants may share access to the server 902 and the database 930, the particular data and services provided from the server 902 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 932 belonging to or otherwise associated with other tenants.

The multi-tenant database 930 is any sort of repository or other data storage system capable of storing and managing the data 932 associated with any number of tenants. The database 930 may be implemented using any type of conventional database server hardware. In various embodiments, the database 930 shares processing hardware 904 with the server 902. In other embodiments, the database 930 is implemented using separate physical and/or virtual database server hardware that communicates with the server 902 to perform the various functions described herein. In an exemplary embodiment, the database 930 includes a database management system or other equivalent software capable of determining an optimal query plan for retrieving and providing a particular subset of the data 932 to an instance of virtual application 928 in response to a query initiated or otherwise provided by a virtual application 928. The multi-tenant database 930 may alternatively be referred to herein as an on-demand database, in that the multi-tenant database 930 provides (or is available to provide) data at run-time to on-demand virtual applications 928 generated by the application platform 910.

In practice, the data 932 may be organized and formatted in any manner to support the application platform 910. In various embodiments, the data 932 is suitably organized into a relatively small number of large data tables to maintain a semi-amorphous "heap"-type format. The data 932 can then be organized as needed for a particular virtual application 928. In various embodiments, conventional data relationships are established using any number of pivot tables 934 that establish indexing, uniqueness, relationships between entities, and/or other aspects of conventional database organization as desired. Further data manipulation and report formatting is generally performed at run-time using a variety of metadata constructs. Metadata within a universal data directory (UDD) 936, for example, can be used to describe any number of forms, reports, workflows, user access privileges, business logic and other constructs that are common to multiple tenants. Tenant-specific formatting, functions and other constructs may be maintained as tenant-specific metadata 938 for each tenant, as desired. Rather than forcing the data 932 into an inflexible global structure that is common to all tenants and applications, the database 930 is organized to be relatively amorphous, with the pivot tables 934 and the metadata 938 providing additional structure on an as-needed basis. To that end, the application platform 910 suitably uses the pivot tables 934 and/or the metadata 938 to generate "virtual" components of the virtual applications 928 to logically obtain, process, and present the relatively amorphous data 932 from the database 930.

The server 902 is implemented using one or more actual and/or virtual computing systems that collectively provide the dynamic application platform 910 for generating the virtual applications 928. For example, the server 902 may be implemented using a cluster of actual and/or virtual servers operating in conjunction with each other, typically in association with conventional network communications, cluster management, load balancing and other features as appropriate. The server 902 operates with any sort of conventional processing hardware 904, such as a processor 905, memory 906, input/output features 907 and the like. The input/output features 907 generally represent the interface(s) to networks (e.g., to the network 945, or any other local area, wide area or other network), mass storage, display devices, data entry devices and/or the like. The processor 905 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 906 represents any non-transitory short or long term storage or other computer-readable media capable of storing programming instructions for execution on the processor 905, including any sort of random access memory (RAM), read only memory (ROM), flash memory, magnetic or optical mass storage, and/or the like. The computer-executable programming instructions, when read and executed by the server 902 and/or processor 905, cause the server 902 and/or processor 905 to create, generate, or otherwise facilitate the application platform 910 and/or virtual applications 928 and perform one or more additional tasks, operations, functions, and/or processes described herein. It should be noted that the memory 906 represents one suitable implementation of such computer-readable media, and alternatively or additionally, the server 902 could receive and cooperate with external computer-readable media that is realized as a portable or mobile component or application platform, e.g., a portable hard drive, a USB flash drive, an optical disc, or the like.

The application platform 910 is any sort of software application or other data processing engine that generates the virtual applications 928 that provide data and/or services to the client devices 940. In a typical embodiment, the application platform 910 gains access to processing resources, communications interfaces and other features of the processing hardware 904 using any sort of conventional or proprietary operating system 908. The virtual applications 928 are typically generated at run-time in response to input received from the client devices 940. For the illustrated embodiment, the application platform 910 includes a bulk data processing engine 912, a query generator 914, a search engine 916 that provides text indexing and other search functionality, and a runtime application generator 920. Each of these features may be implemented as a separate process or other module, and many equivalent embodiments could include different and/or additional features, components or other modules as desired.

The runtime application generator 920 dynamically builds and executes the virtual applications 928 in response to specific requests received from the client devices 940. The virtual applications 928 are typically constructed in accordance with the tenant-specific metadata 938, which describes the particular tables, reports, interfaces and/or other features of the particular application 928. In various embodiments, each virtual application 928 generates dynamic web content that can be served to a browser or other client program 942 associated with its client device 940, as appropriate.

The runtime application generator 920 suitably interacts with the query generator 914 to efficiently obtain multi-tenant data 932 from the database 930 as needed in response to input queries initiated or otherwise provided by users of the client devices 940. In a typical embodiment, the query generator 914 considers the identity of the user requesting a particular function (along with the user's associated tenant), and then builds and executes queries to the database 930 using system-wide metadata 936, tenant specific metadata 938, pivot tables 934, and/or any other available resources. The query generator 914 in this example therefore maintains security of the common database 930 by ensuring that queries are consistent with access privileges granted to the user and/or tenant that initiated the request. In this manner, the query generator 914 suitably obtains requested subsets of data 932 accessible to a user and/or tenant from the database 930 as needed to populate the tables, reports or other features of the particular virtual application 928 for that user and/or tenant.

Each database 930 can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems 900, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems 900, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system 900. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Still referring to FIG. 9, the data processing engine 912 performs bulk processing operations on the data 932 such as uploads or downloads, updates, online transaction processing, and/or the like. In many embodiments, less urgent bulk processing of the data 932 can be scheduled to occur as processing resources become available, thereby giving priority to more urgent data processing by the query generator 914, the search engine 916, the virtual applications 928, etc.

In exemplary embodiments, the application platform 910 is utilized to create and/or generate data-driven virtual applications 928 for the tenants that they support. Such virtual applications 928 may make use of interface features such as custom (or tenant-specific) screens 924, standard (or universal) screens 922 or the like. Any number of custom and/or standard objects 926 may also be available for integration into tenant-developed virtual applications 928. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 926 such as "account" objects, "opportunity" objects, "contact" objects, or the like. The data 932 associated with each virtual application 928 is provided to the database 930, as appropriate, and stored until it is requested or is otherwise needed, along with the metadata 938 that describes the particular features (e.g., reports, tables, functions, objects, fields, formulas, code, etc.) of that particular virtual application 928. For example, a virtual application 928 may include a number of objects 926 accessible to a tenant, wherein for each object 926 accessible to the tenant, information pertaining to its object type along with values for various fields associated with that respective object type are maintained as metadata 938 in the database 930. In this regard, the object type defines the structure (e.g., the formatting, functions and other constructs) of each respective object 926 and the various fields associated therewith.

Still referring to FIG. 9, the data and services provided by the server 902 can be retrieved using any sort of personal computer, mobile telephone, tablet or other network-enabled client device 940 on the network 945. In an exemplary embodiment, the client device 940 includes a display device, such as a monitor, screen, or another conventional electronic display capable of graphically presenting data and/or information retrieved from the multi-tenant database 930. Typically, the user operates a conventional browser application or other client program 942 executed by the client device 940 to contact the server 902 via the network 945 using a networking protocol, such as the hypertext transport protocol (HTTP) or the like. The user typically authenticates his or her identity to the server 902 to obtain a session identifier ("SessionID") that identifies the user in subsequent communications with the server 902. When the identified user requests access to a virtual application 928, the runtime application generator 920 suitably creates the application at run time based upon the metadata 938, as appropriate. As noted above, the virtual application 928 may contain Java, ActiveX, or other content that can be presented using conventional client software running on the client device 940; other embodiments may simply provide dynamic web or other content that can be presented and viewed by the user, as desired.

In one or more embodiments, the subject matter described below in connection with FIGS. 10-14 is implemented in the context of the multi-tenant database system 900, where the chat messaging widgets are integrated with or otherwise provided within instances of one or more virtual applications 928 generated by the server 902.

Browser windows and browser tabs used to navigate webpages may also provide messaging functionality for a user to participate in online communications with live agents or automated messaging applications (e.g., "chat-bots") associated with a business or company associated with a navigated webpage. Such messaging functionality may include capabilities to exchange text-based messages and/or rich content messages during a web-browsing session. Managing communication sessions across browser windows or tabs is complicated by the fact that often different browser applications having different software versions or developers will behave differently from one another, and that the browser application may vary across end users.

Referring again to FIG. 2, in one or more implementations, the real-time updating module 216 is configured to establish and maintain a chat messaging session for the browser application, and accordingly, the real-time updating module 216 may alternatively be referred to herein as a browser-based chat messaging session module. When the browser application is executed, a presentation interface (e.g., browser window, browser tab) is opened. The browser-based chat messaging session module 216 presents a chat messaging interface for a user of the client device 200 to use to conduct a chat messaging session. The chat messaging interface is a graphical element (e.g., window, widget, component) provided by a presentation interface that provides a visual representation of chat messaging data, and that enables a user to communicate with another chat participant. Typically, a chat messaging interface is implemented as a widget or window-inside-browser-window that is smaller than the browser tab or browser window (i.e., browser presentation interface GUI). The chat messaging interface is configured to present (1) user-entered communications, received via the user interface 206 of the client device 200, and (2) communications received by the client device and directed to the user from other chat participants, received by the client device 200 via the communication device 208 using a data communication network (reference 108 of FIG. 10).

The chat messaging interface is further configured to present communications from the user of the client device and other chat participants (e.g., an agent, a chat-bot) using a plain-text format and/or a rich content format. Communications transmitted and received via the chat messaging interface are referred to as "chat messaging data", which includes at least one of text-based chat messages and rich content chat messages. Text-based chat messages are appropriately named to describe exactly what is included: a plain-text message transmitted without requiring particular formatting or other visual effects. Plain-text messages include human-readable sequences of characters that form words and phrases, and that may be encoded into computer-readable formats (e.g., American Standard Code for Information Interchange (ASCII)).

Rich content chat messages may include rich content only, or any combination of text and rich content. Rich content may include graphical elements, enhanced formatting, interactive functionality, and the like. Graphical elements include pictures, symbols, icons, and any other visual representation displayed as part of a presentation interface (i.e., browser window, browser tab). Enhanced formatting refers to visually augmented text representations that include color, styling (e.g., bold text, italic text), text sizing, and other Hyper-Text Markup Language (HTML) features (e.g., hyperlinks). Text representations with enhanced formatting may also be referred to as formatted text, styled text, or rich text. Interactive functionality refers to graphical elements configured to receive user input, such as a graphical button for virtual "push" via user click/selection, a radio button filled in by user selection, a check-box that is "checked" by user selection, a picture or icon that is highlighted, framed, or otherwise indicated as selected by user click/selection, a graphical dial or slider configured for user adjustment, or the like. Interactive functionality of rich content includes any visual representation configured for user interaction and displayed via a chat messaging interface.

A chat messaging session is a conversation or, in other words, a chat messaging session is an exchange of messages between chat participants, wherein one of the chat participants is a user of the client device 200. The chat messaging session is a concept different from a chat messaging interface, as follows: the chat messaging session is the conversation, and the chat messaging interface is the graphical element through which the conversation is conducted and presented by the client device 200. The chat messaging session is also a concept different from the communication session established between the master presentation interface and the remote server system. The chat messaging session is an exchange of communications during one particular conversation between defined parties, wherein the communication messages are exchanged between the client device 200 and the remote server system. The chat messaging session begins when a user of the client device 200 provides a user input command to begin, execute, or otherwise initiate the chat messaging session, via a presentation interface of the browser application. Generally, a user clicks a link on a particular website to begin the chat messaging session, wherein the link is provided via a presentation interface, and wherein user selection of the link executes a chat messaging interface through which the user may conduct the chat messaging session by communicating with one or more defined parties.

Some implementations of the computing device of FIG. 2 include a browser-based storage and extraction module configured to enable the browser application to store rich content chat messages (received via the browser-based chat messaging session module 216) such that the rich content is preserved when the stored rich content messages are later retrieved for viewing via a second chat messaging interface on a second presentation interface. In other words, the browser-based storage and extraction module functions to ensure that rich content chat messages received using a chat interface of a first browser window or browser tab, may be viewed in the original rich content format using a chat messaging interface presented by a different browser window or browser tab of the browser application. To preserve the rich content characteristics, the browser-based storage and extraction module is configured to use a particular storage format and a particular storage location compatible with the browser-based, client-side communication. More specifically, the browser-based storage and extraction module stores rich content chat messaging data as JavaScript Object Notation (JSON) objects in session storage of the master presentation interface. When stored as a JSON object, the characteristics of a rich content chat message are retained, such that when a new browser window or browser tab is opened and the chat messaging session is continued using the new browser window or tab, then the rich content chat message is extracted from the session storage of the master window/tab as a JSON object and presented as a rich content chat message on the new browser window/tab. As described previously, chat messages may be text-based chat messages that are presented in a plain-text format and/or rich content chat messages that are presented using rich content (described previously with regard to the browser-based presentation interface module 212), as shown in FIG. 11.

Figures 11, 12:
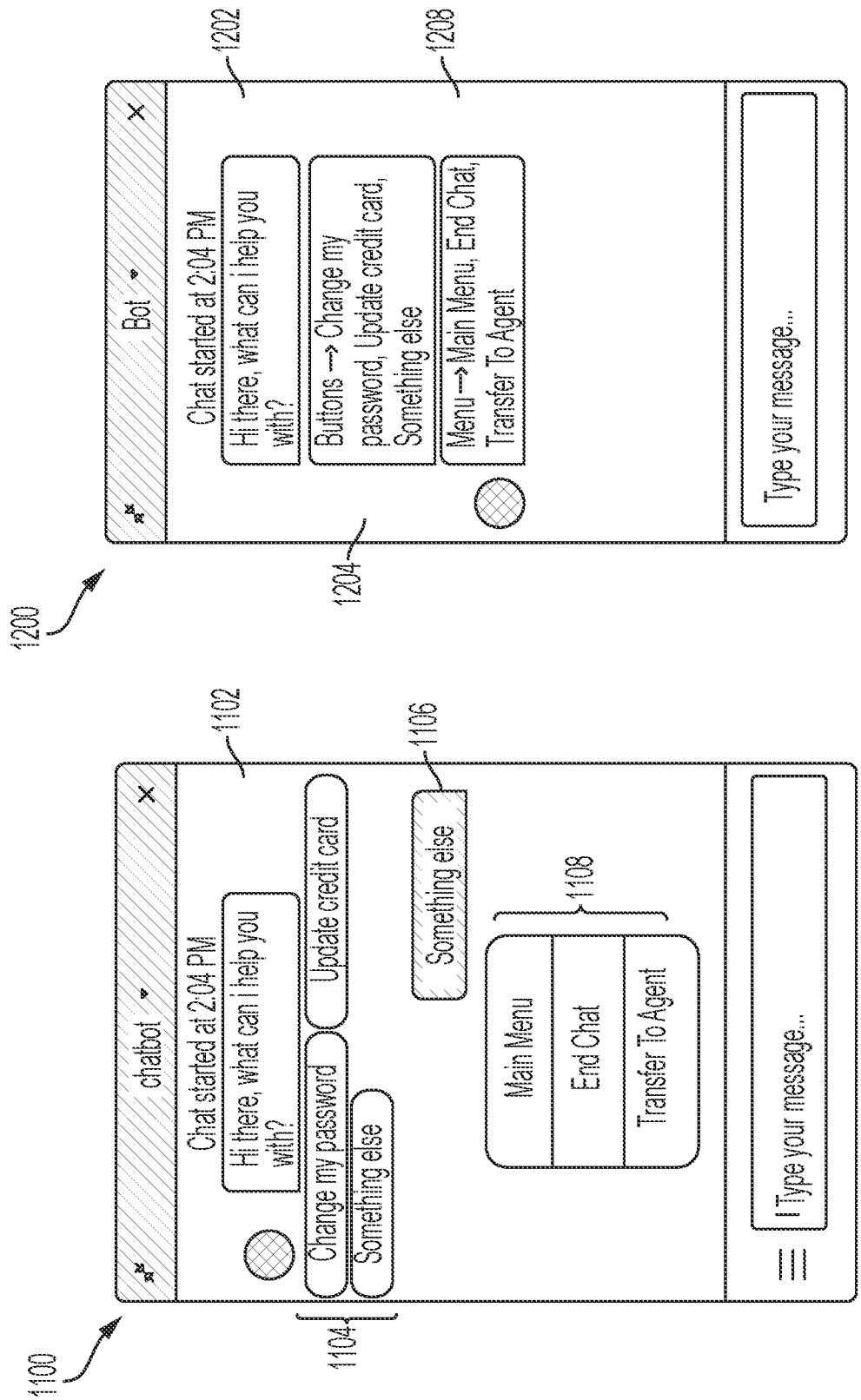
FIG. 11 is a diagram of an embodiment of a chat messaging interface configured to render rich content chat messages and text-based chat messages, in accordance with the disclosed embodiments.
FIG. 12 is a diagram of an embodiment of a chat messaging interface configured to render a text-based version of rich content extracted from browser-based storage, in accordance with the disclosed embodiments.

FIG. 11 is a diagram of an embodiment of a chat messaging interface 1100 configured to render rich content chat messages and text-based chat messages. As shown, the chat messaging interface 1100 presents chat messages for one particular chat messaging session between a user of a client device (see reference 102, FIG. 10; reference 200, FIG. 2) and a "chat-bot" (i.e., an automated chat participant for providing chat messaging data to a user during a chat messaging session). The first chat message includes a text-based chat message 1102 and a rich content chat message 1104 received from the chat-bot to initiate the chat conversation. The text-based chat message 1102 is a plain-text question "Hi there, what can I help you with?", and the rich content chat message 1104 is a set of graphical elements provided for user interaction. In this scenario, the rich content chat message 1104 includes three graphical buttons that a user may select to provide user input to the chat-bot. As shown, the graphical buttons include potential user input responses including: (1) "Change my password", (2)

"Update credit card", and (3) "Something else". The chat messaging interface 1100 shows that the user has provided the user input response "Something else" by selecting the appropriate graphical element, as shown by the displayed text-based message 1106 that includes the text representation "Something else". The chat messaging interface 1100 also presents a graphical element below the chat messages, wherein the graphical element is a menu 1108 of additional user-selectable options from which the user may select to view the "Main Menu" for the chat-bot to present other user-selectable options; the user may select to "End Chat" to terminate the chat messaging session with the chat-bot; and the user may select to "Transfer to an Agent" to transfer the conversation from the chat-bot as the chat participant exchanging chat messages with the user to a live human agent operating a computer system (see reference 104, FIG. 1) as the chat participant exchanging chat messages with the user. As shown in FIG. 11, the chat messaging interface 1100 is capable of presenting both text-based chat messages and rich content chat messages.

Returning to FIG. 2, typically, the client device 200 stores chat messages using a string format for later retrieval and use by a browser application. However, if a chat message that includes rich content (i.e., a rich content chat message) is stored in a string format for later retrieval and presentation via the chat messaging interface, then the rich content characteristics of the rich content chat message would be lost and, upon retrieval from storage, the rich content chat message would instead be displayed in a plain-text format, as shown in FIG. 12.

FIG. 12 is a diagram of an embodiment of a chat messaging interface 1200 configured to render a text-based version of rich content that has been extracted from browser-based storage. FIG. 12 is one embodiment of typical operation of a chat messaging interface 1200 provided by a browser window or browser tab (i.e., a presentation interface), wherein the chat messaging interface 1200 does not include any mechanism for preserving rich content when the browser window or tab has been refreshed or when the user opens a second browser window or tab (i.e., a slave presentation interface) in addition to the first browser window or tab (i.e., the master presentation interface)

Like the chat messaging interface shown in FIG. 11, the chat messaging interface 1200 presents chat messages for one particular chat messaging session between a user of a client device (see reference 102, FIG. 1; reference 200, FIG. 2) and a "chat-bot" (i.e., an automated chat participant for providing chat messaging data to a user during a chat messaging session). However, the chat messaging interface 1200 of FIG. 12 differs from the chat messaging interface 1100 of FIG. 11, due to a lack of rich content displayed. In FIG. 11, the chat messaging interface 1100 presents chat messaging data that includes text-based chat messages and rich content chat messages. In contrast, the chat messaging interface 1200 of FIG. 12 retrieves the displayed chat messaging data from session storage of the master presentation interface, wherein the chat messaging data is presented as plain-text representations, indicating that the rich content chat messages were converted into a string format before storage in the session storage of the master presentation interface.

As shown, the first chat message includes a text-based chat message 1202 and a converted rich content chat message 1204 that has been retrieved from session storage of the master presentation interface. The text-based chat message 1202 and the converted rich content chat message 1204 were originally received by the master presentation interface via the single communication session, and from the chat-bot to initiate the chat conversation. However, in the illustrated scenario, the chat messaging interface 1200 is a slave presentation interface that is either newly opened or just refreshed by the user. Generally, the rich content chat messages are text-based due to browser window/tab refresh or due to opening a new browser window/tab. In both situations, the chat messaging interface 1200 extracts a stored version of the chat messaging session from session storage of the master presentation interface to display the stored version via the chat messaging interface 1200. Thus, the chat messaging interface 1200 has retrieved the chat session data from session storage of the master presentation interface.

Like FIG. 11, the text-based chat message 1202 is a plain-text question "Hi there, what can I help you with?" However, unlike FIG. 11, the converted rich content chat message 1204 does not include rich content (e.g., graphical elements provided for user interaction). In this scenario, the converted rich content chat message 1204 includes a plain-text representation of the three graphical buttons: (1) "Change my password", (2) "Update credit card", and (3) "Something else". The chat messaging interface 1200 also presents a second converted rich content element 1208 below the chat messages, wherein the second converted rich content element 1208 is a plain-text representation of the menu of additional user-selectable options (e.g., "Main Menu", "End Chat", "Transfer to an Agent"). As shown in FIG. 12, the chat messaging interface 1200 is capable of presenting text-based chat messages and converted rich content chat messages that have been converted into a plain-text format.

To solve this problem, as described herein and in greater detail in U.S. patent application Ser. No. 16/164,649, the client device (reference 102, FIG. 10; reference 200, FIG. 2) is configured to store the chat messaging data in session storage of the master presentation interface in a JavaScript Object Notation (JSON) object format, such that the rich content characteristics of the chat messaging data are retained and displayed via a slave presentation interface that is newly-opened or refreshed by a user.

Thus, in some implementations, the browser-based storage and extraction module stores chat messaging data using a storage format and storage location such that rich content chat messages retain rich content characteristics, preventing inadvertent conversion of rich content chat messages (and formatting, visual effects, and interactive capabilities of the rich content chat messages) into plain-text format when stored by the browser application and later retrieved for use. The chat messaging data is stored in session storage for the master presentation interface, and the session storage is propagated to other open browser tabs and browser windows via a broadcast pipeline of the browser application.

Rich content chat messages are locally stored by the browser application in session storage of a particular presentation interface as JSON objects, and the broadcast pipeline is used to transmit the JSON objects to other open presentation interfaces such that the rich content chat messages are presented in a rich content format across all open presentation interfaces. Continuity of rich content chat messages (across all open presentation interfaces for the browser application) is thus provided through the storage format for the rich content chat messages (e.g., JSON object storage), and the retrieval method for the rich content chat messages (e.g., obtaining rich content chat messages via the broadcast pipeline for the browser application).

As described herein, each of the open presentation interfaces of the browser application is capable of presenting a chat messaging interface to enable a user of the client device 200 to participate in a chat messaging session wherein the user provides user input chat messages to the client device 200 and the user receives chat messages from a second chat participant via the distinct communication session between the client device 200 and a remote server system. (As described with regard to FIG. 10, chat messages received by the client device 200 may be from a live agent user of the computer system 104 or from an automated "chat-bot" implemented via the computer system 104 or the remote server system 106. In either case, the server system 106 that has the communication session with the client device 102 receives all chat communications and then directs and transmits the chat communications to the appropriate receiving computer system/client device/receiving party.) Chat messaging interfaces, displayed and associated with corresponding presentation interfaces, are configured to present chat messages in a plain-text format and in a rich content format. The browser-based communication channel module 214 is thus configured to provide a communication channel for transmitting chat messaging data that includes both plain-text chat messaging data and rich content chat messaging data.

In some implementations, the real-time updating module 216 is configured to dynamically update all presentation interfaces of the browser application, in real-time, such that all open presentation interfaces (and corresponding chat messaging interfaces) present the same interactive data for a current chat messaging session, including rich content messages that include visual effects and interactive functionality. The real-time updating module 216 is configured to use the broadcast pipeline (via the browser-based communication channel module 214) to provide updates to a master presentation interface from one or more slave presentation interfaces, and to provide updates to a set of slave interfaces from a master presentation interface. As one example, a rich content chat message received as user input to a particular slave presentation interface is provided to the master presentation interface via the broadcast pipeline as an update, which may then be provided via the broadcast pipeline from the master presentation interface to all open slave presentation interfaces. In this scenario, all open presentation interfaces and corresponding chat messaging interfaces are dynamically updated to include the user input rich content chat message, in real-time. As another example, a rich content chat message may be received by the master presentation interface from a remote server via the one distinct communication session between the master presentation interface and the remote server, and the rich content chat message may then be provided via the broadcast pipeline from the master presentation interface to all open slave presentation interfaces. In this scenario, all open presentation interfaces and corresponding chat messaging interfaces are dynamically updated to include the server-provided rich content chat message, in real-time.

Figure 13:
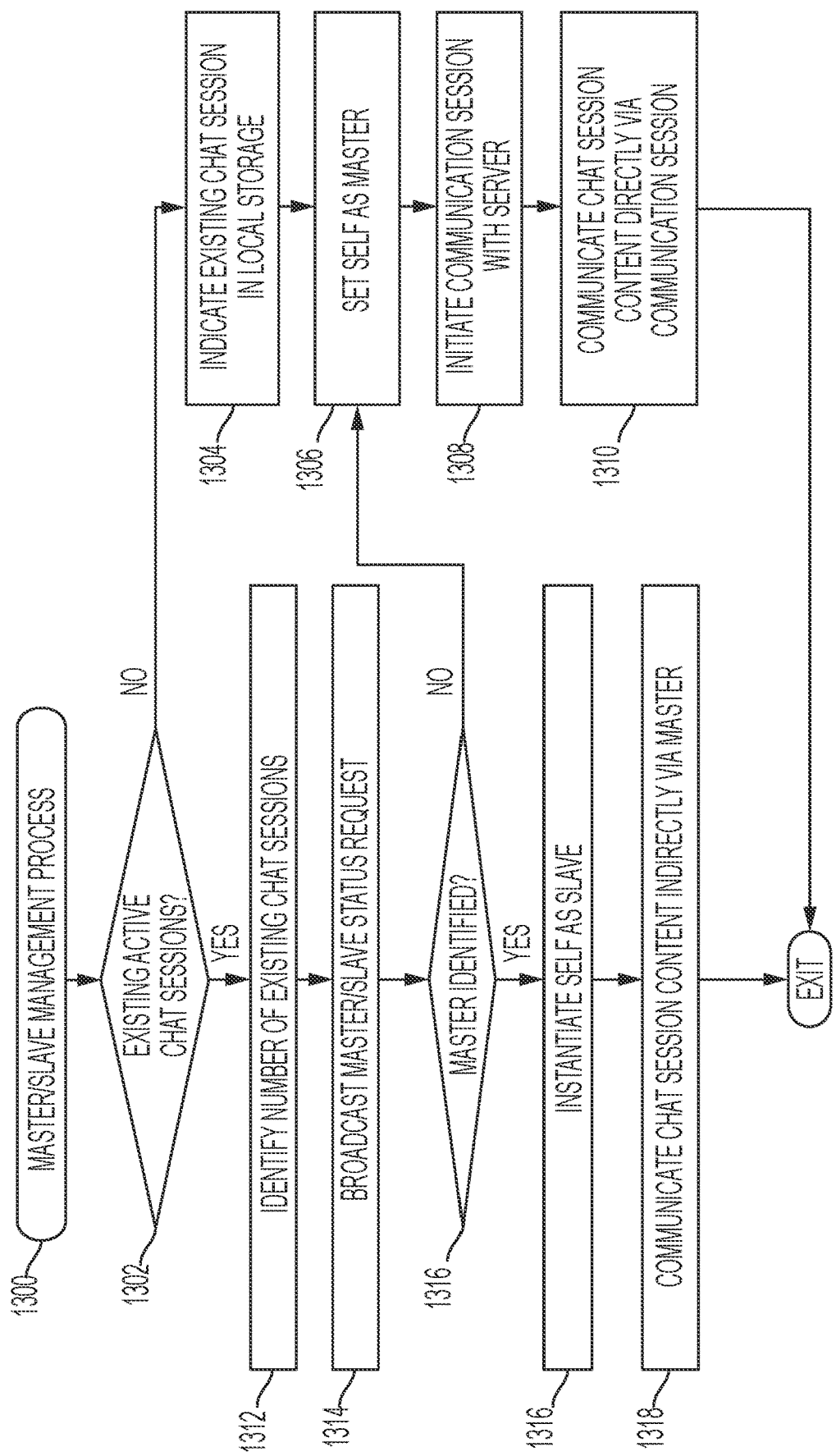
FIG. 13 is a flow diagram of an exemplary master/slave management process suitable for implementation in the system of FIG. 10 in accordance with one or more exemplary embodiments.
Figure 14:
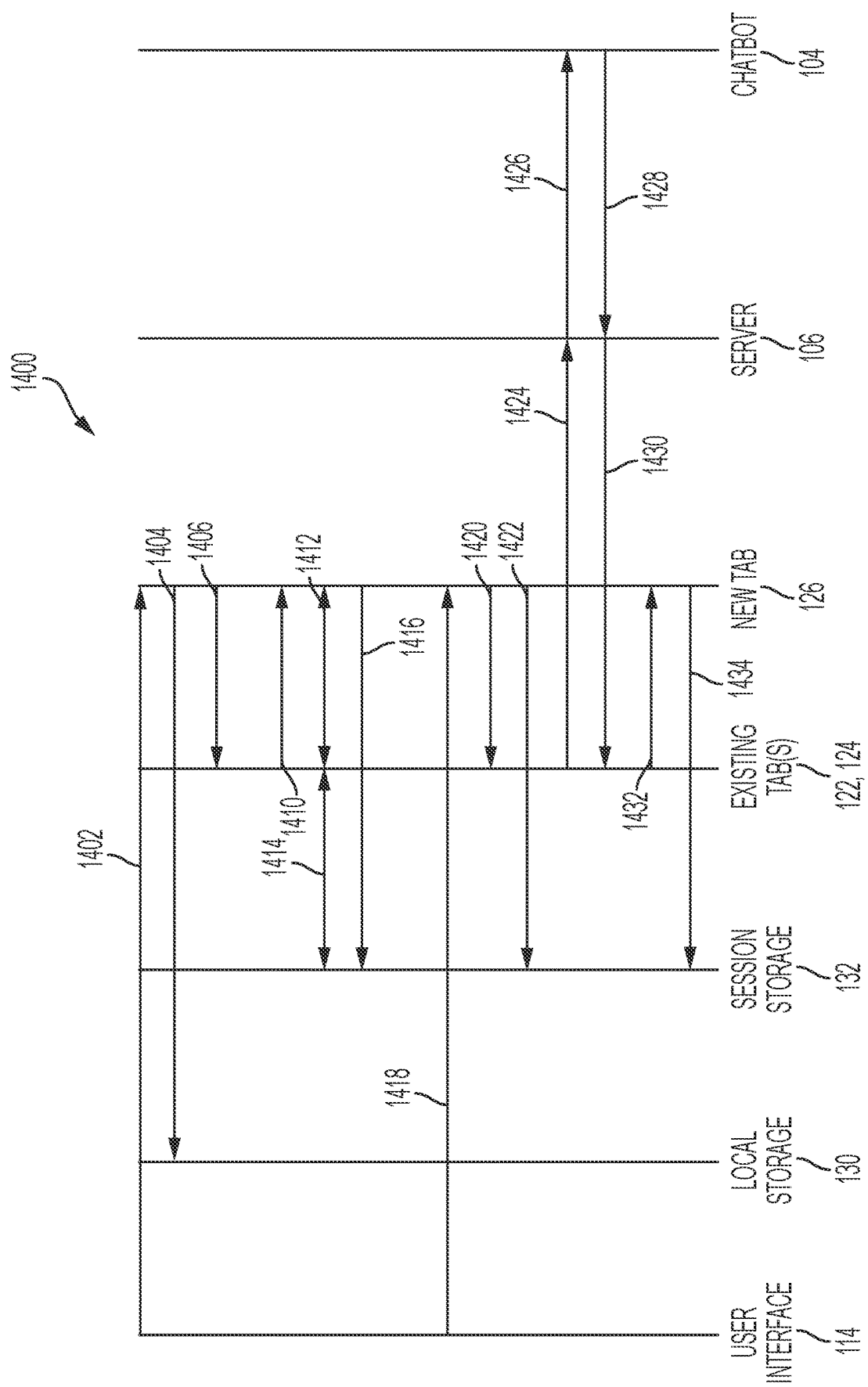
FIG. 14 depicts a sequence of communications within the system of FIG. 10 in connection with the master/slave management process in accordance with one or more exemplary embodiments.

FIG. 13 depicts an exemplary master/slave management process 1300 that may be implemented or otherwise performed by an instance of a presentation interface (e.g., one of presentation interfaces 122, 124, 126) that includes an integrated chat messaging interface or widget upon opening, creation, or other instantiation to avoid inadvertent establishment of multiple communication sessions with a server (e.g., server system 106), and FIG. 14 depicts an exemplary sequence 1400 of communications or other tasks or operations that may be performed in connection with master/slave management process 1300 of FIG. 13. The client-side master/slave management process 1300 resolves issues that could otherwise arise from different browser behaviors, for example, upon opening new tabs. Thus, the master/slave management process 1300 is able to avoid scenarios where more than one browser tab (or window) believes it is the master, and thereby maintains only a single communication session with a server rather than inadvertently initiating additional communication sessions which could disrupt the preexisting communication session (e.g., if server-side rules result in termination of the existing communication session), undesirably consume server resources, or otherwise impair the ability to maintain consistency and continuity across tabs. While exemplary embodiments of the master/slave management process 1300 may be described herein in the context of opening, creating, or otherwise instantiating a new browser tab, the subject matter is not limited to a new browser tab event and may be performed in response to other trigger events, such as, for example, a refresh of the master tab, the master tab navigating to a different web page or network address, an end user clicking or otherwise selecting a hyperlink within the master tab, and the like.

Referring to FIG. 13, in exemplary embodiments, the process 1300 begins by checking local storage to identify or otherwise determine whether there are any existing active chat sessions that correspond to the chat session within the newly instantiated presentation interface, and in the absence of any existing active chat sessions, the newly instantiated presentation interface updates the local storage to indicate there is now an existing active chat session and sets itself as master for that chat session (tasks 1302, 1304, 1306). In this regard, in exemplary embodiments, when a communication session with a server for purposes of supporting a chat session is established, the master presentation interface instantiates or otherwise sets a variable in local storage 130 that is associated with a unique identifier for the chat session to a value of 1 to indicate an active chat session. For example, the master presentation interface 122 may instantiate or otherwise create a variable ACTIVE_CHAT_SESSIONS in local storage 130 that is associated with a unique identifier for the chat messaging session to be supported. In this regard, the unique identifier may include or otherwise incorporate identifying information associated with the particular chatbot system 104 that is part of the chat session (e.g., using the uniform resource locator (URL) address, internet protocol (IP) address, domain, or other identifying information associated with the chatbot system 104). The master presentation interface 122 sets the value of the local storage variable to 1 (e.g., ACTIVE_CHAT_SESSIONS=1) to indicate the presence of an existing chat session. In this regard, in the absence of a local storage variable associated with the unique identifier for the chat messaging session to be supported or if the local storage variable associated with the unique identifier for the chat messaging session to be supported is equal to zero, the newly instantiated presentation interface determines it should be the master. Upon such determination, the newly instantiated presentation interface may instantiate or otherwise create a private JavaScript variable that indicates it is the master. For example, the master presentation interface 122 may instantiate or otherwise create a private variable isTabMaster in a JavaScript file associated with the page and set the variable value to indicate it is the master (e.g., a value of 'TRUE,' '1', a unique identifier associated with the master presentation interface 122, etc.).

In the illustrated embodiment, after determining and designating oneself as master, the process 1300 continues with the master presentation interface initiating or otherwise establishing a communication session with the server system and communicating content for the chat session directly to/from the server system via that communication session (tasks 1308, 1310). In exemplary embodiments, the master presentation interface 122 transmits or otherwise provides a long-polling request to the server system 106, which, in turn, holds the request open to maintain an available communication session with the master presentation interface 122 for providing chat messaging content from the chatbot system 104 back to the master presentation interface 122 without incurring additional overhead (e.g., handshaking or other signaling required to establish another connection). In response to the long-polling request, the server system 106 may similarly initiate a long-polling communication session with the chatbot system 104, thereby allowing the master presentation interface 122 and the chatbot system 104 to communicate bidirectionally via the server system 106 substantially in real-time without delays that could otherwise be associated with reestablishing communication sessions for each individual communication. In exemplary embodiments, the master presentation interface 122 also creates or instantiates a session storage variable that maintains information or data pertaining to the communication session with the server system 106 along with the serialized chat messaging content that has been communicated to/from the chatbot system 104. For example, the master presentation interface 122 may instantiate or otherwise create a variable CHASITOR_SERIALIZED_KEY in its session storage 132 that includes or otherwise maintains associations between data pertaining to the established long-polling connection with the server system 106 (e.g., a poll count and the like for synchronizing the client and server within the real-time conversation) and the serialized time-ordered sequence of text and/or rich content that make up the communications sent to and/or received from the chatbot system 104.

On the other hand, when the newly instantiated presentation interface identifies existing chat sessions, the process 1300 proceeds by identifying or otherwise determining the number of existing chat sessions using the local storage and then broadcasts or otherwise transmits a master/slave status request intended for receipt by the existing presentation interfaces (tasks 1312, 1314). In this regard, when a presentation interface 124 identifies a variable in local storage 130 that is associated with the unique identifier for the chat session to be supported and has a nonzero value or otherwise indicates an existing chat session for that identifier, the presentation interface 124 determines there are existing active chat sessions and obtains the number of existing active chat sessions from local storage 130 (e.g., the current value of the ACTIVE_CHAT_SESSIONS local storage key). The newly instantiated presentation interface 124 then generates a broadcast request for the master/slave status for existing presentation interface(s) associated with the same chat session, and then broadcasts the master/slave status request using the broadcast API. In exemplary embodiments, the existing presentation interface(s) associated with the same chat session are configured to listen for or otherwise detect broadcast events corresponding to its chat session. In response to receiving the broadcast master/slave status request, the existing presentation interface(s) are configured to check its respective JavaScript file in local storage 130 to identify whether the private JavaScript variable indicates it is a master or slave and provide a corresponding response. For example, the master presentation interface 122 may obtain the value of its private JavaScript variable isTabMaster (e.g., TRUE) and broadcast the value back out to the newly instantiated presentation interface 124 using the broadcast API. In some embodiments, slave presentation interfaces do not create a private variable for indicating master status, and thus, broadcast a response that include a null value or otherwise indicates slave status.

The process 1300 monitors or otherwise waits for master/slave status responses from the other presentation interfaces associated with the existing chat sessions until receiving the number of responses corresponding to the number of existing chat sessions or otherwise timing out, and thereafter identifies or otherwise determines whether a master exists (task 1316). In this regard, in a scenario when the newly instantiated presentation interface receives the number of responses corresponding to the previously-identified number of active chat sessions but none of the existing presentation interfaces identifies itself as master, the newly instantiated presentation interface may increment or otherwise update the number of existing chat sessions in local storage to account for itself and then set itself as master, in a similar manner as described above. For example, upon refresh, the presentation interface 122 may broadcast a master/slave status request using the broadcast API, and receiving responses from other presentation interfaces 124, 126 indicating they are slaves. Thus, the presentation interface 122 may determine it was the master prior to the refresh and re-set itself as master after the refresh. Conversely, when the process 1300 receives a response indicating another presentation interface is the master, the newly instantiated presentation interface instantiates itself as a slave and thereafter communicates with the chatbot system indirectly via the master presentation interface (task 1318, 1320).

For example, in response to identifying the existing master presentation interface 122, the second presentation interface 124 may instantiate itself as a slave by creating a JSON object or similar file corresponding to its instance of the chat session that does not include the isTabMaster variable or includes the isTabMaster variable set to a value that indicates it is a slave (e.g., 'FALSE,' '0,' an identifier of the master presentation interface 122, or the like). Thereafter, the second presentation interface 124 copies the existing chat messaging content from the session storage 132 for the master presentation interface 122 to its own session storage 132, in a similar manner as described in U.S. patent application Ser. No. 16/164,649. User inputs received via the chat messaging interface within the slave presentation interface 124 are provided to the master presentation interface 122 using the broadcast API, with the master presentation interface 122 then retransmitting the input chat messaging content to the server system 106 via the existing communication session between the master presentation interface 122 and the server system 106. Similarly, chat messaging content provided by the chatbot system 104 responsive to any user inputs within the chat messaging interface within the slave presentation interface 124 are provided by the server system 106 to the master presentation interface 122 via the existing communication session between the master presentation interface 122, with the master presentation interface 122 providing the updated chatbot content to the slave presentation interface 124 using the broadcast API. Further details regarding indirect communications via a master presentation interface are provided in U.S. patent application Ser. No. 16/164,649.

It should be appreciated that the master/slave management process 1300 may include any number of additional or alternative tasks, the tasks need not be performed in the illustrated order and/or the tasks may be performed concurrently, and/or the master/slave management process 1300 may be incorporated into a more comprehensive procedure or process having additional functionality not described in detail herein. Moreover, one or more of the tasks shown and described in the context of FIG. 13 could be omitted from a practical embodiment of the master/slave management process 1300 as long as the intended overall functionality remains intact.

FIG. 6 depicts an exemplary sequence 1400 of communications within the system 100 in connection with an exemplary embodiment of the master/slave management process 1300 of FIG. 13. In the illustrated sequence 1400, the master/slave management process 1300 is initiated in response to receiving an input 1402 from the user interface 114 that causes the browser application 120 to open, instantiate or otherwise generate a new presentation interface, such as a new browser tab 126. Upon instantiation, the new browser tab 126 having an embedded chat messaging interface accesses 1404 the local storage 130 to identify whether there are any existing chat sessions corresponding to the same chat messaging service associated with chatbot system 104. For example, the new tab 126 may identify the presence of two existing active chat messaging sessions when the value of the ACTIVE_CHAT_SESSIONS local storage variable associated with an identifier for the chat messaging service associated with chatbot system 104 has a value equal to 2.

When the new browser tab 126 identifies existing chat messaging sessions, the new tab 126 broadcasts 1406 a master/slave status request for the existing tabs 122, 124 associated with the same chat messaging service using a broadcast API. The existing tabs 122, 124 access their respective JSON object files to identify whether or not the respective tab 122, 124 is a master or slave based on the state of a private variable defined therein and then transmits or otherwise provides a response 1410 back to the new tab 126 that indicates their respective status. In this regard, the master tab 122 may identify it is the master based on a value of a private variable in the JSON object file associated with the master tab 122 and provide a response indicating it is the master. Likewise, an existing slave tab 124 may identify it is a slave based on a value of a private variable (or the absence of such private variable) in the JSON object file associated with the tab 124 and provide a response indicating it is a slave. In exemplary embodiments, the new tab 126 waits until receiving indicia of an existing master or the number of received responses corresponds to the number of active chat messaging sessions (e.g., 2).

After the new tab 126 identifies the existing tab 122 as the master, the new tab 126 communicates 1412 with the master tab 122 to retrieve or otherwise obtain 1414 the chat messaging content from the session storage 132 associated with the master tab 122. After receiving the messaging content from the session storage 132 associated with the master tab 122 via the master tab 122, the new tab 126 may automatically populate the chat messaging interface within the new tab 126 with the up-to-date chat messaging content that reflects the state of the existing active chat. In exemplary embodiments, the new tab 126 instantiates 1416 its session storage 132 with a copy of the chat messaging content received from the master tab 122 and configures its associated JSON object file to designate itself as a slave.

Thereafter, when a user manipulates the user interface 114 to input or otherwise provide 1418 a new chat input via the chat messaging interface of the new tab 126, the new tab 126 provides 1420 the new chat input to the master tab 122 using the broadcast API and updates its session storage 132 to include the newly-received chat messaging content. The master tab 122 similarly updates 1422 its session storage 132 to include the newly-received chat messaging content and transmits or otherwise provides 1424 the new chat input to the server system 106 via the existing communication session, for example, as a long-polling response to a previous long-polling request from the server system 106. Similarly, the server system 1426 retransmits or otherwise provides the new chat input from the user to the chat messaging service at the chatbot system 104 via the existing communication session between the server system 106 and the chatbot system 104. The chat messaging service at the chatbot system 104 processes or otherwise analyzed the user input to generate corresponding chat response content and transmits or otherwise provides 1428 the chat response to the server system 106, which, in turn provides 1430 the chat response content back to the master tab 122 via the existing communication sessions. The master tab 122 updates its session storage 132 to include the chat response content and then generates a broadcast event that indicates new chat messaging content to the slave tabs 124, 126 via the broadcast API. In response to the broadcasted update, the new tab 126 automatically retrieves or otherwise obtains 1432 the chat response content from the master tab 122, automatically updates 1434 its session storage to include the chat response content, and automatically updates the chat messaging interface within the new tab 126 with the up-to-date chat messaging content that reflects the response from the chat messaging service.

By virtue of the master/slave management process 1300, any number of new tabs can be opened without disrupting the existing communication session with the server. The existing communication session with the server can then be utilized by the new tabs to communicate information via the server via the master tab responsible for establishing and/or maintaining the existing communication session, thereby preserving server-side resources. It should be noted that because the private master/slave status variable is maintained in a file stored in memory independently or outside of browser storage, it may not persist across reloads. Thus, upon refresh or reload of what was previously the master tab, the master/slave management process 1300 may be performed before re-designating the tab as master when the other existing tabs all respond indicating they are slaves.

It should be noted that the subject matter described herein may also be utilized to reassign the master when the master tab is closed. For example, when a slave tab attempts to pass a chat input to a no longer existing master tab (e.g., at 1420 in the sequence 1400), the slave tab may be configured to detect or otherwise identify the previous master tab no longer exists, and in response, initiate the master/slave management process 1300 to verify whether any existing active chat sessions still exist (task 1302). If not, the slave tab may automatically make itself the new master (e.g., tasks 1304, 1306, 1308, 1310). Otherwise, the slave tab may broadcast to see whether any of the other tabs are masters (e.g., tasks 1312, 1314, 1316). If none of the existing tabs are masters, the slave tab may automatically make itself the new master (e.g., tasks 1304, 1306, 1308, 1310). Conversely, if another slave tab has elevated to master upon termination of the previous master, the slave tab may automatically update to account for the new master tab (e.g., tasks 1316, 1318).

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The preceding description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although a schematic shown in a drawing figure may depict one exemplary arrangement of elements, additional intervening elements, devices, features, or components may be present in a practical embodiment of the depicted subject matter.

For the sake of brevity, conventional techniques related to chatbots, artificial intelligence, database systems, multi-tenancy, on-demand database systems, signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of supporting communication with a remote device across a plurality of graphical user interfaces presented at a client device coupled to a network, the method comprising:
  broadcasting, by a first graphical user interface of the plurality of graphical user interfaces, a status request to one or more of the plurality of graphical user interfaces presented at the client device;
  receiving, by the first graphical user interface, a response from a second graphical user interface of the plurality of graphical user interfaces, the second graphical user interface having an existing communication session with the remote device;
  configuring, by the first graphical user interface, an object associated with the first graphical user interface maintained at the client device based at least in part on the response from the second graphical user interface of the plurality of graphical user interfaces; and
  thereafter communicating, by the first graphical user interface, with the remote device over the network via the existing communication session using the second graphical user interface of the plurality of graphical user interfaces.

2. The method of claim 1, further comprising identifying, by the first graphical user interface, one or more existing active chat sessions with a chat messaging service associated with a chat messaging interface of the first graphical user interface prior to broadcasting the status request.

3. The method of claim 2, wherein identifying the one or more existing active chat sessions comprises determining a number of existing active chat sessions based on a value of a local storage variable in local storage associated with a browser application.

4. The method of claim 1, wherein configuring the object comprises copying chat messaging content from session storage associated with the second graphical user interface to session storage associated with the first graphical user interface.

5. The method of claim 4, wherein a second object associated with the second graphical user interface identifies the second graphical user interface as a master.

6. The method of claim 1, wherein configuring the object comprises creating a JavaScript Object Notation (JSON) object that does not include a private variable identifying the first graphical user interface as a master.

7. The method of claim 6, wherein a second JSON object associated with the second graphical user interface includes the private variable identifying the second graphical user interface as the master.

8. The method of claim 1, wherein configuring the object comprises creating a JavaScript Object Notation (JSON) object with a private variable having a value identifying the first graphical user interface as a slave.

9. The method of claim 8, wherein a second JSON object associated with the second graphical user interface includes the private variable having a second value identifying the second graphical user interface as a master.

10. The method of claim 1, wherein the object comprises a file associated with the first graphical user interface.

11. A non-transitory machine-readable storage medium that provides instructions that, when executed by a processor, are configurable to cause the processor to perform operations comprising:
broadcasting, by a first graphical user interface of a plurality of graphical user interfaces, a status request to one or more of the plurality of graphical user interfaces;
receiving, by the first graphical user interface, a response from a second graphical user interface of the plurality of graphical user interfaces, the second graphical user interface having an existing communication session with a remote device;
configuring, by the first graphical user interface, an object associated with the first graphical user interface based at least in part on the response from the second graphical user interface of the plurality of graphical user interfaces; and
thereafter communicating, by the first graphical user interface, with the remote device over a network via the existing communication session using the second graphical user interface of the plurality of graphical user interfaces.

12. The non-transitory machine-readable storage medium of claim 11, wherein the instructions are configurable to cause the processor to identify one or more existing active chat sessions with a chat messaging service associated with a chat messaging interface of the first graphical user interface prior to broadcasting the status request.

13. The non-transitory machine-readable storage medium of claim 12, wherein the instructions are configurable to cause the processor to determine a number of existing active chat sessions based on a value of a local storage variable in local storage associated with a browser application.

14. The non-transitory machine-readable storage medium of claim 11, wherein the instructions are configurable to cause the processor to copy chat messaging content from session storage associated with the second graphical user interface to session storage associated with the first graphical user interface.

15. The non-transitory machine-readable storage medium of claim 11, wherein the instructions are configurable to cause the processor to create a JavaScript Object Notation (JSON) object that does not include a private variable identifying the first graphical user interface as a master.

16. The non-transitory machine-readable storage medium of claim 11, wherein the instructions are configurable to cause the processor to create a JavaScript Object Notation (JSON) object with a private variable having a value identifying the first graphical user interface as a slave.

17. The non-transitory machine-readable storage medium of claim 11, wherein the object comprises a file associated with the first graphical user interface.

18. An apparatus comprising:
a processor;
a non-transitory machine-readable storage medium that provides instructions that, when executed by the processor, are configurable to cause the apparatus to perform operations comprising:
broadcasting, by a first graphical user interface of a plurality of graphical user interfaces, a status request to one or more of the plurality of graphical user interfaces;
receiving, by the first graphical user interface, a response from a second graphical user interface of the plurality of graphical user interfaces, the second graphical user interface having an existing communication session with a remote device;
configuring, by the first graphical user interface, a file associated with the first graphical user interface based at least in part on the response from the second graphical user interface of the plurality of graphical user interfaces; and
thereafter communicating, by the first graphical user interface, with the remote device over a network via the existing communication session using the second graphical user interface of the plurality of graphical user interfaces.

19. The apparatus of claim 18, wherein the instructions are configurable to cause the processor to copy chat messaging content from session storage associated with the second graphical user interface to session storage associated with the first graphical user interface.

20. The apparatus of claim 18, wherein the second graphical user interface comprises a master graphical user interface.

* * * * *